US012673296B2

(12) United States Patent
Rahislic et al.

(10) Patent No.: US 12,673,296 B2
(45) Date of Patent: Jul. 7, 2026

(54) MEMBRANE SEPARATOR

(71) Applicant: Honeywell International Inc., Charlotte, NC (US)

(72) Inventors: Emir Rahislic, Chicago, IL (US); Mark Triezenberg, Westmont, IL (US); Rebecca Kamire, Buffalo Grove, IL (US); David Loeffelholz, Long Beach, CA (US)

(73) Assignee: Honeywell International Inc., Charlotte, NC (US)

( * ) Notice: Subject to any disclaimer, the term of this patent is extended or adjusted under 35 U.S.C. 154(b) by 261 days.

(21) Appl. No.: 18/425,403

(22) Filed: Jan. 29, 2024

(65) Prior Publication Data

US 2025/0242311 A1 Jul. 31, 2025

(51) Int. Cl.

| | |
|---|---|
| ***B01D 63/04*** | (2006.01) |
| ***B01D 19/00*** | (2006.01) |
| ***B01D 53/14*** | (2006.01) |
| ***B01D 53/18*** | (2006.01) |
| ***B01D 53/22*** | (2006.01) |
| ***B01D 53/26*** | (2006.01) |

(52) U.S. Cl.

CPC ....... *B01D 63/043* (2013.01); *B01D 19/0031* (2013.01); *B01D 53/1425* (2013.01); *B01D 53/1475* (2013.01); *B01D 53/18* (2013.01); *B01D 53/229* (2013.01); *B01D 53/268* (2013.01); *B01D 2257/104* (2013.01); *B01D 2257/504* (2013.01); *B01D 2257/80* (2013.01); *B01D 2259/4575* (2013.01)

(58) Field of Classification Search

CPC .............. B01D 63/043; B01D 19/0031; B01D 53/1425; B01D 53/1475; B01D 53/18; B01D 53/229; B01D 53/268; B01D 2257/104; B01D 2257/504; B01D 2257/80; B01D 2259/4575; B01D 2311/2626; B01D 61/00; B01D 2315/22; Y02C 20/40

See application file for complete search history.

(56) References Cited

U.S. PATENT DOCUMENTS 5,071,552 A * 12/1991 Bikson ................. B01D 63/025 210/321.89
5,281,254 A 1/1994 Birbara et al.
5,695,545 A * 12/1997 Cho ....................... B01D 53/60 96/6
5,954,858 A * 9/1999 Peretti .................... B01D 53/84 95/44

(Continued)

FOREIGN PATENT DOCUMENTS

CN 112933879 A 6/2021
EP 0462226 B1 5/1995

*Primary Examiner* — Dung H Bui

(74) *Attorney, Agent, or Firm* — Shumaker & Sieffert, P.A.

(57) ABSTRACT

A separation system includes a membrane separator. The membrane separator includes a hollow fiber membrane configured to receive two or more fluid streams. The hollow fiber membrane includes a first tubesheet set coupled to a first set of fibers and a second tubesheet set coupled to a second set of fibers. The first tubesheet set and the first set of fibers are configured to transfer one or more components from a first gas stream into a shell side volume. The second tubesheet set and the second set of fibers are configured to transfer the one or more components from the shell side volume into a second gas stream.

20 Claims, 11 Drawing Sheets

(56) References Cited

U.S. PATENT DOCUMENTS 6,149,817 A * 11/2000 Peterson ............ B01D 19/0031 210/321.78
8,398,743 B2 3/2013 Molaison et al.
10,005,022 B2 6/2018 Sirkar
10,688,435 B2 * 6/2020 Henson .............. B01D 53/1475
10,773,212 B2 9/2020 Seibert et al.
11,123,685 B2 * 9/2021 Isobe ....................... B64G 1/48
11,291,954 B2 4/2022 Isobe et al.
11,491,464 B1 * 11/2022 Bikson ............... B01J 20/28038
11,628,397 B2 4/2023 Henson et al.
12,502,640 B1 * 12/2025 Bikson ................. B01D 53/226
2002/0162451 A1 * 11/2002 Bikson ................. B01D 63/032 95/55
2002/0195385 A1 * 12/2002 Cho ..................... B01D 63/026 210/321.74
2011/0239866 A1 * 10/2011 Coan .................... B01D 53/228 55/482
2012/0137879 A1 * 6/2012 Taylor .................. B01D 63/027 96/6
2015/0053083 A1 * 2/2015 Taylor ................ B01D 19/0031 96/6
2016/0016111 A1 * 1/2016 Sirkar ................ B01D 53/1475 423/220
2017/0001150 A1 * 1/2017 Kulkarni ................ B01D 63/02
2018/0147544 A1 * 5/2018 Lively ................ B01D 67/0088
2018/0243682 A1 * 8/2018 Isobe ................... B01D 53/268
2018/0243685 A1 * 8/2018 Henson .................. B01D 53/22
2020/0088423 A1 * 3/2020 Scovazzo ............... B01D 63/02
2021/0061475 A1 * 3/2021 Kamire .............. B01D 53/1487
2021/0069635 A1 * 3/2021 Skomurski ............... B64G 1/48
2021/0299606 A1 * 9/2021 Henson .............. B01D 53/1443
2021/0339200 A1 * 11/2021 Isobe ................... B01D 63/031
2022/0356400 A1 * 11/2022 Birk ......................... C09K 8/86
2023/0107163 A1 * 4/2023 Xiang .................... B01D 71/34 210/638
2024/0002246 A1 * 1/2024 Luis Alconero ....... B01D 61/00
2024/0109776 A1 * 4/2024 AlQahtani .......... C01B 17/0413
2024/0140788 A1 * 5/2024 Rakib .................. B01D 53/229
2025/0242311 A1 * 7/2025 Rahislic ............. B01D 53/1425

* cited by examiner

MEMBRANE SEPARATOR

GOVERNMENT RIGHTS

This invention was made with Government support under Grant Contract Number 80MSFC18C0045 awarded by National Aeronautics and Space Administration (NASA) Marshall Space Flight Center. The Government has certain rights in the invention.

TECHNICAL FIELD

The present disclosure relates to systems and techniques for transferring components, such as gaseous contaminants, between two fluid streams.

BACKGROUND

Various systems may discharge components in a fluid stream, such as humidity in a gas stream. As one example, a fuel cell may discharge exhaust air that contains humidity. As another example, an environmental control system (ECS) of a structure, such as a building or vehicle, may remove gaseous contaminants to maintain comfort and safety. As yet another example, a proton exchange membrane (PEM) may lose moisture during operation and discharge the lost moisture. Compensating for the loss of these discharged components through make-up components, such as storage water, may add additional weight to the system. However, recycling the components may require separation and purification, which may also add weight to the system. For example, gaseous contaminants may be absorbed from the environment by a liquid sorbent at a scrubber and desorbed or degassed from the liquid sorbent at a stripper or degasser for discharge from the structure. Each of the scrubbing, stripping, and degassing operations may be performed by different systems that contribute to an overall weight and volume of the system.

SUMMARY

The disclosure describes systems and techniques for separating components, such as carbon dioxide or water vapor, from a gas stream using a membrane separator that includes a hollow fiber membrane. The hollow fiber membrane includes two or more sets of fibers that transfer components into a shell side volume. A first set of fibers transfer components from the gas stream into the shell side volume of the membrane separator, and a second set of fibers transfer the contaminants from the shell side volume into another gas stream, such as a product stream. In some examples, the membrane separator is a membrane contactor that uses a circulating liquid sorbent to absorb the components from the first set of fibers and either/both desorb a target component, such as carbon dioxide, or degas other components, such as oxygen or nitrogen, into the second set of fibers before being discharged from the membrane contactor. For example, different portions of the membrane contactor may be maintained at different temperatures to improve either scrubbing or stripping/degassing operations for certain components. In some examples, the membrane separator is a membrane gas separator that uses different sets of fibers having different degrees of permeability to improve control of conditions within the shell side volume during transfer of components, such as water vapor, from the gas stream to another gas stream. In these various ways, membrane separators described herein may consolidate two or more separation operations into a single unit and/or improve separation using an intermediate fluid medium or volume.

In some examples, the disclosure describes a separation system that includes a membrane separator. The membrane separator includes a hollow fiber membrane configured to receive two or more fluid streams. The hollow fiber membrane includes a first tubesheet set coupled to a first set of fibers and a second tubesheet set coupled to a second set of fibers. In some examples, the first set of fibers is configured to transfer one or more contaminants from a first gas stream into a shell side volume, and the second set of fibers is configured to transfer the one or contaminants from the shell side volume into a second gas stream. In other examples, the first and second sets of fibers are configured to either transfer one or more contaminants from the shell side volume to the respective first or second gas stream, or transfer one or more contaminants from the first or second gas stream to the shell side volume.

In some examples, the membrane separator described above is a membrane contactor configured to absorb the one or more contaminants from the first gas stream into a liquid sorbent of the liquid sorbent stream in the shell side volume, and desorb at least a portion of the one or more contaminants from the liquid sorbent into the second gas stream. In some examples, the membrane separator described above is a membrane dehumidifier configured to transfer water vapor from the first gas stream into the second gas stream via the shell side volume.

In some examples, the disclosure describes a method that includes receiving, by a first set of fibers of a hollow fiber membrane of a membrane separator, a first gas stream that includes one or more contaminants and transferring, by the first set of fibers, the one or more contaminants from the first gas stream into a shell side volume of the membrane separator. The membrane separator receives two or more fluid streams, such as the first gas stream or either a liquid sorbent stream or a second gas stream. The method includes transferring, by a second set of fibers of the hollow fiber membrane, at least a portion of the one or more contaminants from the shell side volume into the second gas stream and discharging, by the second set of fibers, the second gas stream from the hollow fiber membrane.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

The disclosure describes systems and techniques for transferring components, such as carbon dioxide or water, from one fluid stream to another fluid stream using a hollow fiber membrane. Separation systems described herein may be utilized in a variety of applications. Example applications include, but are not limited to crown dehumidification in aircraft to reduce airline fuel costs; air dehumidification in spacecraft to reduce weight and volume; humidity recovery of exhaust from fuel cells in motor vehicles or aircraft to reduce make-up water; contaminant removal from watercraft, such as submarines; and contaminant removal from spacecraft through dehumidification and/or absorption into a liquid sorbent; humidity recovery in proton exchange membranes.

In some examples, separation systems described herein may be utilized as part of an environmental control system (ECS), such as in spacecraft, aircraft, watercraft, and the like. In some examples, separation systems may be used in an ECS of a resource-limited environment, such as a spacecraft. Such resource-limited environments may be particularly suited for a separation system that consolidates functions, such as stripping, scrubbing, and/or degassing, or that uses an intermediate volume to transfer contaminants between two gas streams and using two or more different types of fibers.

Figure 1A:
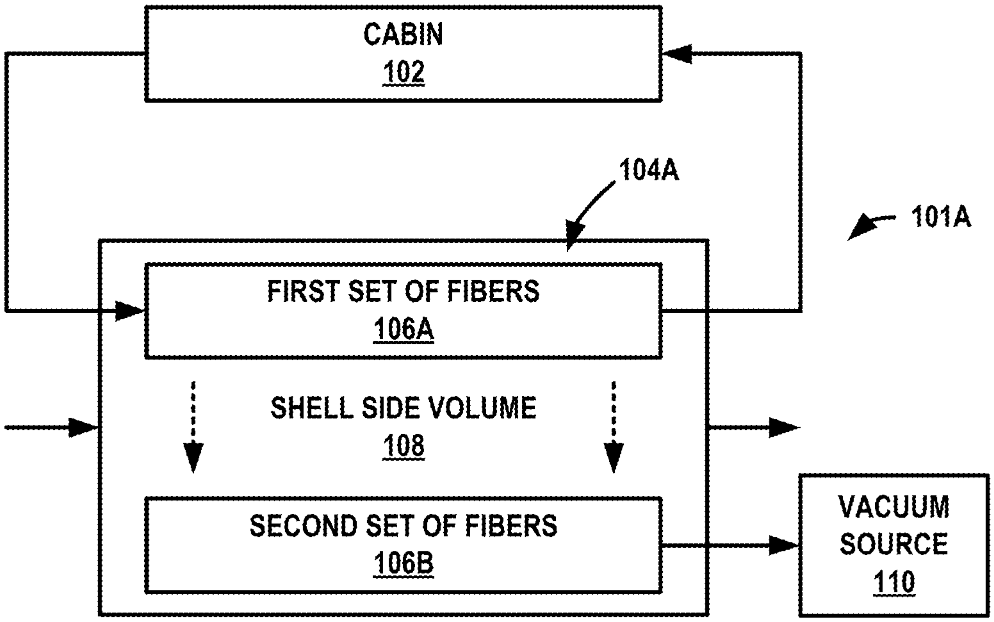
FIG. 1A is a block diagram illustrating an example membrane separator for removing one or more contaminants.
Figure 1B:
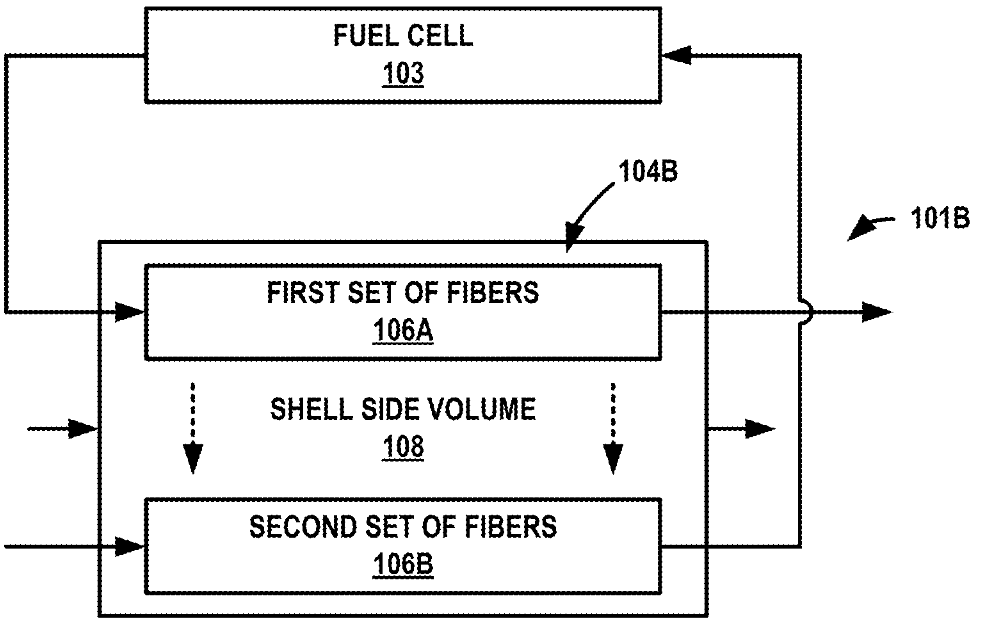
FIG. 1B is a block diagram illustrating an example membrane separator for recovering one or more components.
Figure 1C:
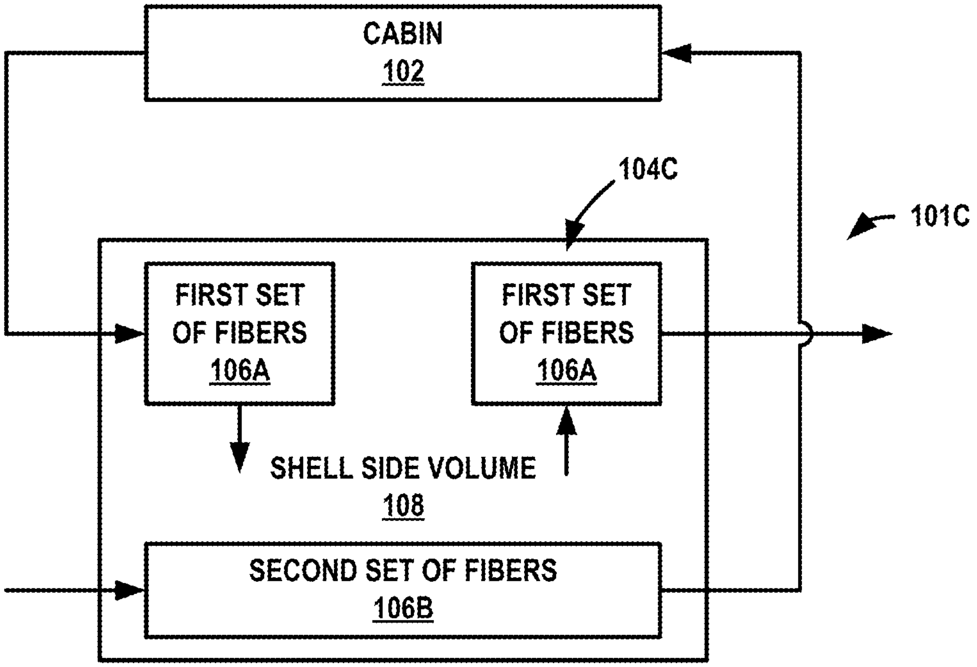
FIG. 1C is a block diagram illustrating an example membrane separator for transferring one or more contaminants.

FIGS. 1A, 1B, and 1C are block diagrams illustrating example membrane separators 101A, 101B, and 101C for removing one or more components, such as contaminants from a cabin 102 (FIG. 1A or 1C) or fuel cell (FIG. 1B). Each membrane separator 101 is configured to receive two or more fluid streams, including a gas stream and either another gas stream, a liquid stream, or both. Each membrane separator 101 includes one or more hollow fiber membranes 104A or 104B in a shell side volume 108. Shell side volume 108 includes a fluid medium, such as a circulating liquid sorbent or gas medium, for transferring components between the fluid streams. Each hollow fiber membrane 104 includes a first set of fibers 106A and a second set of fibers 106B. First set of fibers 106A is configured to transfer one or more components from a first gas stream into shell side volume 108. Second set of fiber 106B is configured to transfer at least a portion of the components from shell side volume 108 into a second gas stream to be discharged from membrane separator 101A or 101B.

In the example of FIG. 1A, membrane separator 101A is a membrane contactor configured to receive a first gas stream (e.g., cabin air stream that includes contaminants) from cabin 102 and a liquid sorbent stream from another system, such as a liquid sorbent loop (not shown). The contaminants, including both primary contaminants such as carbon dioxide and secondary contaminants such as oxygen, permeate through first set of fibers 106A into the liquid sorbent in shell side volume 108 and are absorbed by the liquid sorbent. The liquid sorbent may be maintained at conditions, such as temperature and flow rate, which improve mass transfer of contaminants into and from the liquid sorbent. A vacuum source 110 fluidically coupled to second set of fibers 106B maintains a vacuum on second set of fibers 106B to desorb at least a portion of the contaminants from the liquid sorbent into a second gas stream (e.g., a contaminant or degas stream).

In some examples, the membrane contactor may function as both a scrubber and a stripper by desorbing primary contaminants, such as carbon dioxide, and discharging the primary contaminants to vacuum source 110 for further downstream processing. In other examples, the membrane contactor may function as both a scrubber and a degasser by desorbing secondary components, such as oxygen and nitrogen, such that the liquid sorbent stream may be further processed to desorb the primary contaminants. While described as providing different desorption and degassing functions, such different functions may be provided on a continuum based on conditions, such as temperature, within the membrane contactor, and a membrane contactor may include both functions depending on a configuration of the first and second sets of fibers 106A and 106B, compositions of the various fluid streams, and operating conditions within the membrane contactor.

In the example of FIG. 1A, the liquid sorbent operates as a transfer medium to separate a component from a gas stream. In other examples, the liquid sorbent may operate as a transfer medium to transfer a component from one gas stream to another gas stream. In the example of FIG. 1B, membrane separator 101B is a membrane contactor configured to receive a first gas stream (e.g., fuel cell exhaust stream that includes components such as humidity) from a fuel cell 103 and a liquid sorbent stream from another system, such as a liquid sorbent loop (not shown). The components permeate through first set of fibers 106A into the liquid sorbent in shell side volume 108 and are absorbed by the liquid sorbent. The liquid sorbent may be maintained at conditions, such as temperature and flow rate, which improve mass transfer of contaminants into and from the liquid sorbent. A second gas stream may flow through second set of fibers 106B to desorb at least a portion of the humidity from the liquid sorbent into a second gas stream, which is returned to fuel cell 103. In this way, membrane separator 101B may maintain capture and return at least some humidity lost from fuel cell 103.

As an alternative to using a liquid sorbent as a transfer medium, membrane separators described herein may use shell side volume 108 as part of the flow path for at least one gas stream to better control transfer conditions between two or more gas streams. In the example of FIG. 1C, membrane separator 101C is a membrane gas separator, such as a membrane dehumidifier, configured to receive a first gas stream (e.g., cabin air stream) from cabin 102 and a second gas stream (e.g., a decontaminated air stream) from another system, such as a contaminant removal system (not shown). The contaminants, such as water vapor, flow through first set of fibers 106A from the cabin air stream into shell side volume 108 and from shell side volume 108 back into first set of fibers 106A. While in shell side volume 108, at least a portion of the contaminants permeate through the second set of fibers into the decontaminated air stream. First set of fibers 106A and second set of fibers 106B may have different degrees of permeation. As shown in FIG. 1C, first set of fibers 106A may include a first subset of fibers that discharges the first gas stream into shell side volume 108 and a second subset of fibers that receives the first gas stream from the shell side volume 108. In this way, membrane separator 101C may use an intermediate volume to control transfer conditions for transferring the contaminants from one gas stream into another gas stream.

Figure 1D:
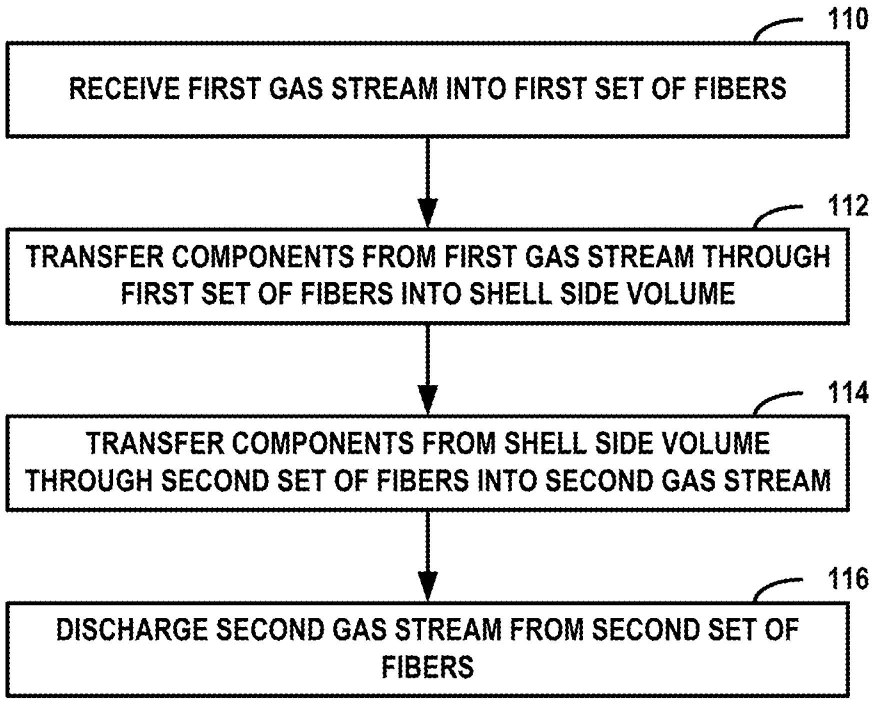
FIG. 1D is an example flowchart of a method for separating one or more contaminants from a cabin air stream.

FIG. 1D is an example flowchart of a method for separating one or more contaminants from a cabin air stream. FIG. 1D will be described with respect to membrane separator 101A, membrane separator 101B, and membrane separator 101C of FIGS. 1A, 1B, and 1C above, respectively. The method of FIG. 1D includes receiving, by first set of fibers 106A of hollow fiber membrane 104A, 104B, or 104C, a first gas stream that includes one or more components (110). The first gas stream may be a target gas stream for which the components, such as contaminants, may be removed for passenger comfort and/or recovered for resource management.

The method of FIG. 1D includes transferring, by first set of fibers 106A, the one or more components from the first gas stream into a shell side volume 108 (112) and transferring, by a second set of fibers 106B of hollow fiber membrane 104A or 104B, at least a portion of the one or more contaminants from shell side volume 108 into a second gas stream (114). In examples in which the membrane separator is a membrane gas separator 101C, transferring the components includes discharging the first gas stream into shell side volume 108 and transferring components, such as water vapor, from shell side volume 108 into the second gas stream.

In examples in which the membrane separator is a membrane contactor 101A or 101B, transferring the contaminants includes absorbing the contaminants from the first gas stream into a liquid sorbent in shell side volume 108 and desorbing at least a portion of the contaminants from the liquid sorbent into the second gas stream, such as a product stream, a degas stream, or both. In some instances, a first portion of the contaminants may be desorbed from the liquid sorbent into a degas stream by a first membrane contactor, such as membrane contactor 101A, while a second portion of the contaminants may be desorbed from the liquid sorbent into a product stream by another membrane contactor. In other instances, membrane contactor 101A may include regions of variable conditions (e.g., temperature) of the liquid sorbent within shell side volume 108, in which first set of fibers 106A is positioned at least partially upstream of second set of fibers 106B with respect to a flow of the liquid sorbent, and in which the method includes maintaining a temperature of the liquid sorbent proximate to first set of fibers 106A higher than a temperature of the liquid sorbent proximate to second set of fibers 106B.

The method of FIG. 1D includes discharging, by second set of fibers 106B, the second gas stream from hollow fiber membrane 104A, 104B, or 104C (116). For example, the second gas stream may be a product stream or a degas stream discharged for venting or further processing, or may be a decontaminated air stream rehumidified for use in cabin 102.

Figure 2A:
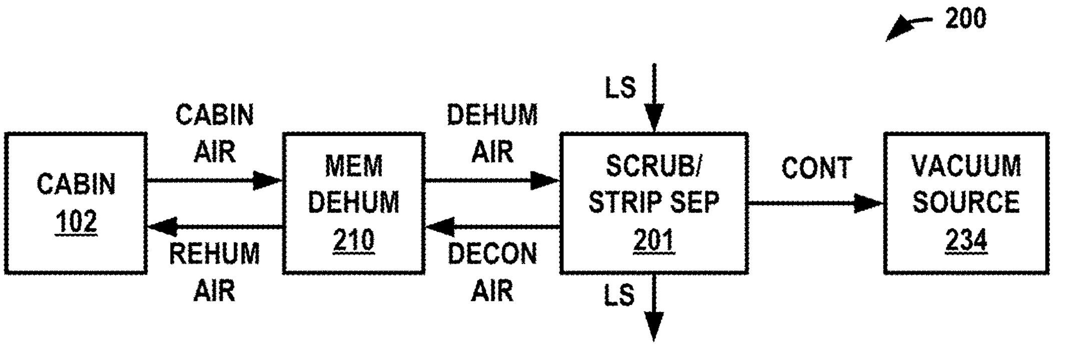
FIG. 2A is a block diagram illustrating an example separation system that includes a membrane contactor configured to scrub and strip one or more contaminants from a cabin air stream.

FIG. 2A is a block diagram illustrating an example separation system 200 that includes a membrane contactor 201 ("SCRUB/STRIP SEP") configured to scrub and strip one or more contaminants from a cabin air stream. In the example of FIG. 2A, a cabin air stream ("CABIN AIR") from cabin 102 is treated by an optional membrane dehumidifier 210 ("MEM DEHUM") to remove a portion of water vapor and discharged as a dehumidified air stream ("DEHUM AIR") to membrane contactor 201. Membrane contactor 201 is configured to receive the dehumidified air stream and a liquid sorbent stream ("LS") that includes a liquid sorbent. Membrane contactor 201 is configured to both absorb one or more contaminants from the dehumidified air stream into the liquid sorbent and desorb at least a portion of the one or more contaminants from the liquid sorbent into a product stream, such as a contaminant stream ("CONT"). Vacuum source 234 may provide a vacuum on membrane contactor 201 to aid in desorbing the one or more contaminants from the liquid sorbent. Membrane contactor 201 is configured to discharge a decontaminated air stream ("DECON AIR") to membrane dehumidifier 210 for rehumidification, and membrane dehumidifier 210 is configured to discharge a rehumidified air stream ("REHUM AIR") to cabin 102.

By consolidating stripping and scrubbing operations into a single unit, separation system 200 may have a lower overall weight and/or use less power than separation systems that include two or more membrane contactors that each perform a single stripping or scrubbing function. For example, desorption of contaminants in a separate unit, such as a standalone stripper, may require a separate membrane contactor for stripping and additional equipment for circulating and conditioning the liquid sorbent for desorption. Consolidation of these absorption and desorption functions may either replace the stripper with the single unit or reduce a size of the stripper and other equipment in the liquid sorbent loop.

Figure 2B:
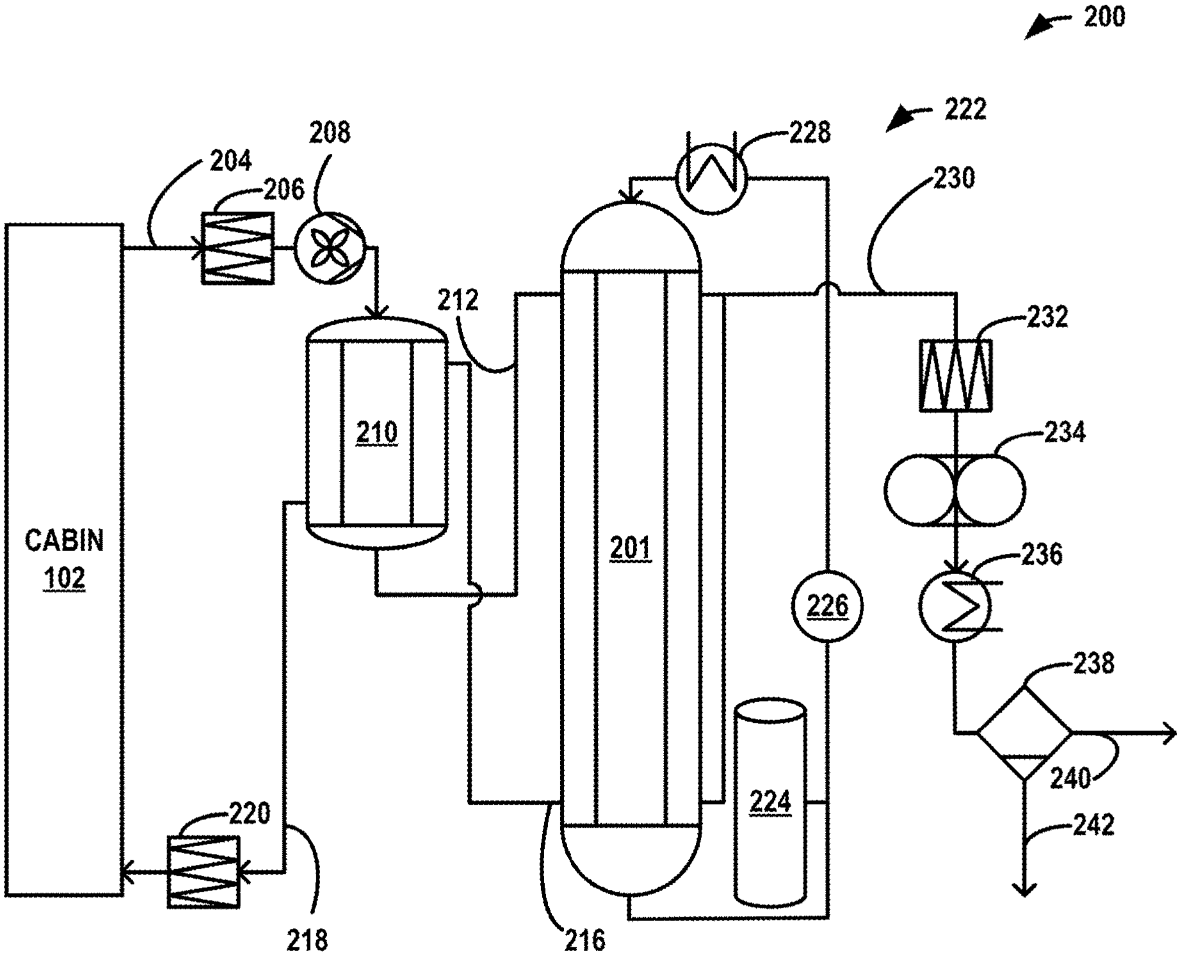
FIG. 2B is a schematic diagram illustrating the example separation system of FIG. 2A that includes a membrane contactor configured to scrub and strip one or more contaminants from a cabin air stream.

FIG. 2B is a schematic diagram illustrating the example separation system 200 of FIG. 2A that includes membrane contactor 201 configured to scrub and strip one or more contaminants from a cabin air stream 204. Cabin 102 may be a controlled environment, such as an aircraft cabin, spacecraft cabin, watercraft cabin, or the like, and contaminants removed from cabin 102 may include, but are not limited to, carbon dioxide, water, hydrocarbons, permanent gases, or the like. In the example of FIG. 2B, cabin 102 may be a cabin of a closed-loop system, such as a spacecraft cabin or submarine cabin, in which components of cabin air stream 204 from cabin 102, such as carbon dioxide and water, may be removed within separation system 200, allowing a purified rehumidified air stream 218 to be generated. In some examples, cabin air stream 204 may have a carbon dioxide concentration between about 1000 ppm and about 5000 ppm and/or a hydrocarbon concentration less than about 100 ppm. Rehumidified air stream 218 has a lower concentration of carbon dioxide than cabin air stream 204. For example, rehumidified air stream 218 may have a concentration of carbon dioxide that is about 25% to about 99% less than a concentration of carbon dioxide in cabin air stream 204, such as about 40% to about 95% less than the concentration of carbon dioxide in cabin air stream 204. In other examples, cabin 102 may be a cabin of an open-loop system, such as an aircraft cabin, in which components of a cabin air stream may be removed to generate a purified supply air stream with only partial or no subsequent recovery of the contaminants.

Separation system 200 includes a cabin air circuit (not labeled) configured to circulate cabin air between cabin 102 and membrane contactor 201. In the example of FIG. 2B, cabin air stream 204 includes a filter 206 configured to remove particulates from cabin air stream 204 prior to entry into a membrane dehumidifier 210 and a blower 208 configured to draw cabin air into membrane dehumidifier 210, while rehumidified air stream 218 includes a filter 220 configured to remove any leaked liquid sorbent and/or further filter clean air from rehumidified air stream 218 prior to entry into cabin 102.

In the example of FIG. 2B, separation system 200 includes a membrane dehumidifier 210 configured to return humidity from cabin air stream 204 to a decontaminated air stream 216 and discharge a dehumidified air stream 212 to membrane contactor 201. On one side, membrane dehumidifier 210 is configured to receive cabin air stream 204 as a feed gas stream and discharge dehumidified air stream 212 to membrane contactor 201 having a lower humidity. As a result, dehumidified air from dehumidified air stream 212 discharged from dehumidifier 210 may have a lower humidity than cabin air from cabin air stream 204 received by dehumidifier 210. For example, dehumidified air stream 212 may have a humidity that is between about 0% and about 35% relative humidity. On an opposite side, membrane dehumidifier 210 is configured to receive decontaminated air stream 216 from membrane contactor 201 and discharge rehumidified air to rehumidified air stream 218 having a higher humidity, such that rehumidified air stream 218 may have a higher humidity than the humidity of decontaminated air stream 216. For example, rehumidified air stream 218 may have a humidity that is selected to maintain a humidity of cabin 102 between about 5% and about 75% relative humidity. In some examples, rehumidified air stream 218 may receive substantially all the humidity removed from cabin air stream 204, such that little or no humidity from cabin air stream 204 may be absorbed downstream of membrane dehumidifier 210.

Membrane contactor 201 is configured to absorb carbon dioxide and other contaminants from dehumidified air stream 212 into the liquid sorbent and discharge decontaminated air stream 216 back to membrane dehumidifier 210. Operation of membrane contactor 201 will be described further in FIGS. 2C and 2D below. Contaminant stream 230 may be continuously removed from membrane contactor 201 to assist migration of the carbon dioxide from the loaded liquid sorbent into contaminant stream 230.

Separation system 200 includes liquid sorbent loop 222 configured to circulate liquid sorbent through membrane contactor 201. For example, a pump 226 may pump unloaded liquid sorbent from an outlet of membrane contactor 201 back to an inlet of membrane contactor 201. Unloaded liquid sorbent may include unused liquid sorbent free of contaminants or regenerated liquid sorbent having a lower concentration of contaminants than the loaded liquid sorbent. In some examples, the unloaded liquid sorbent may be cooled by a cooler 228 prior to entry into membrane contactor 201. A liquid sorbent storage 146 may store liquid sorbent, such as in a relatively cool state.

In the example of FIG. 2B, separation system 200 may include one or more systems or components configured to further process contaminant stream 230. In some examples, separation system 200 includes a filter 232, a vacuum source (e.g., compressor) 234, a condenser 236, and a water separator 238 configured to compress contaminant stream 230 and remove water from the compressed contaminant stream 230. For example, for carbon dioxide removed from separation system 200 to be stored or recycled, vacuum source 234, condenser 236, and water separator 238 may compress contaminant stream 230 to a high pressure and remove nearly all water from contaminant stream 230. In a life support application, a large amount of water may be present in cabin air stream 204. For example, the humidity in cabin air stream 204 may be much higher than that of carbon dioxide. A Sabatier system may require a water concentration of less than 10% to react hydrogen gas with carbon dioxide, such as less than about 5%.

Filter 232 is configured to remove any leaked liquid sorbent and/or further filter clean contaminants from contaminant stream 230. Vacuum source 234 is configured to compress contaminant stream 230. A variety of vacuum sources may be used for vacuum source 234 including, but not limited to, centrifugal compressors, positive displacement compressors, and the like. Condenser 236 may be configured to cool contaminant stream 230 and condense water from contaminant stream 230. For example, condenser 236 may be coupled to a refrigeration system or other cooling system that circulates a cooling medium to cool contaminant stream 230. A variety of condensers may be used for condenser 236 including, but not limited to, shell and tube heat exchangers, plate-fin, surface coolers, heat pipes, thermoelectric devices, cooling jackets, and the like. Water separator 238 may be configured to remove water from contaminant stream 30, discharge a dehumidified contaminant stream 240 to a Sabatier system, and discharge water condensate stream 242 to a water storage system. A variety of water separators may be used for water separator 238 including, but not limited to, static phase separators, capillary phase separator, membrane phase separators, centrifugal/rotary separators, and the like.

A controller (not shown) may be communicatively coupled to and configured to receive measurement signals from one or more sensor sets, and other process control components (not shown) of separation system 100, such as: control valves for cabin air stream 204, dehumidified air stream 212, decontaminated air stream 216, rehumidified air stream 218, contaminant stream 230, and inlets/outlets to liquid sorbent storage 224 and cooler 228; pump 226; blower 208, vacuum source 234; and the like.

Figure 2C:
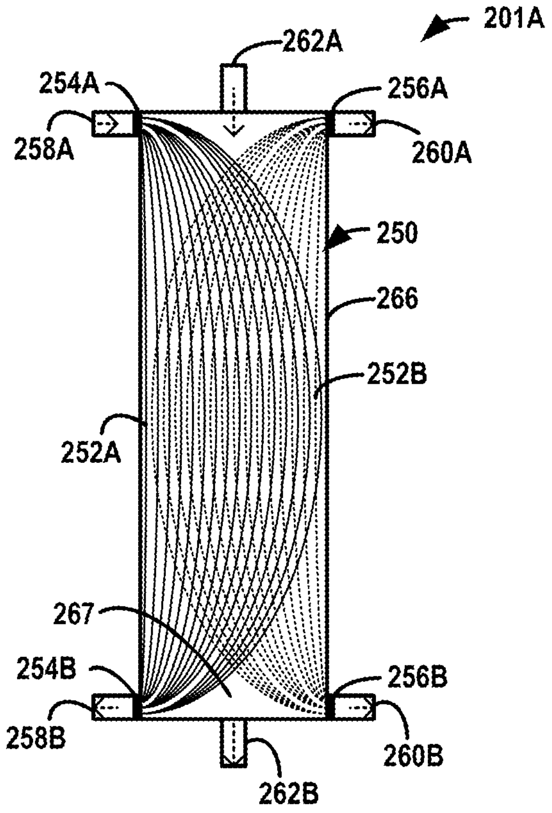
FIG. 2C is a cross-sectional side view diagram illustrating an example membrane contactor of FIG. 2A configured to scrub and strip one or more contaminants.

Membrane contactors described herein, such as membrane contactor 201 of FIGS. 2A and 2B, may be configured to provide a high degree of mass transfer within membrane contactor 201 by intermixing the different sets of fibers that absorb and desorb the contaminants. FIG. 2C is a cross-sectional side view diagram illustrating an example membrane contactor 201A configured to scrub and strip one or more contaminants.

Membrane contactor 201A includes a hollow fiber membrane 250. Hollow fiber membrane 250 may include a cylindrical module filled with parallel or woven hollow porous fibers forming a hydrophobic porous membrane. In the example of FIG. 2C, hollow fiber membrane 250 includes a first set of fibers 252A bounded by a first set of tubesheets 254A and 254B and a second set of fibers 252B bounded by a second set of tubesheets 256A and 256B. Each tubesheet 254A, 254B, 256A, 256B may include an epoxy or other substantially nonporous material for coupling fibers 252A or 252B and sealing the ends of fibers 252A or 252B with a respective port. First set of fibers 252A is configured to transfer one or more contaminants from a first gas stream into a shell side volume. Second set of fibers 252B is configured to transfer the one or contaminants from the shell side volume into a second gas stream.

Membrane contactor 201A includes a housing 266. Housing 266 defines a shell side volume 267 in which one or more hollow fiber membranes 250 may be positioned. Housing 266 includes a first set of gaseous ports 258A and 258B fluidically coupled to first set of fibers 252A and a second set of gaseous ports 260A and 260B fluidically coupled to second set of fibers 252B, and a set of liquid ports 262A and 262B fluidically coupled to the shell side volume. One of gaseous ports 258A or 258B is fluidically coupled to receive a gas stream, while the other of gaseous ports 258A or 258B is fluidically coupled to discharge a gas stream. At least one of gaseous ports 260A or 260B is fluidically coupled to discharge a gaseous stream, while the other of gaseous ports 260A or 260B may be fluidically coupled to receive a gaseous stream, such as a sweep gas stream.

First set of fibers 252A and second set of fibers 252B may be configured to enable transfer of contaminants between a gas stream and a liquid sorbent. Each of first set of fibers 252A and second set of fibers 252B includes porous hollow fibers. For example, dimensions of these hollow fibers could be less than about 3 mm, and the pore dimension could be less than about 2 microns. The hollow fibers of first set of fibers 252A may be intertwined (e.g., bundles of a single fiber type mixed with bundles of another fiber type) or intermixed (e.g., bundles having both fiber types) with the hollow fibers of second set of fibers 252B, such that contaminants absorbed from the first set of fibers 252A may be proximate to the second set of fibers 252B. The high surface area of the hollow fiber membrane contactors enables a high mass transfer of contaminant gases, such as carbon dioxide and water, into and out of the respective liquid sorbent using a relatively small system volume and weight. The material of the hollow fibers can be selected such that the liquid sorbent does not wet the pores, and the trans-membrane pressure is kept sufficiently low to prevent pore penetration. As a result, the membrane contactor may ensure that the liquid sorbent and gas stream do not need further separation, such that separation system 200 may act in a gravity-independent way without the use of moving parts.

Fibers of first and second sets of fibers 252A and 252B may be selected for the particular transfer conditions encountered for respective scrubbing and stripping operations. In some examples, first and second sets of fibers 252A and 252B may have different properties. For example, first set of fibers 252A may have a higher permeability, and correspondingly lower pressure drop, across the fiber wall, thereby reducing wetting of the liquid sorbent through the fibers. Fiber materials may include, but are not limited to, hydrophobic materials such as polypropylene, polyvinylidene fluoride, polysulfone, polyimide, polytetrafluoroethylene (PTFE), and the like. In some examples, a coating may be applied to reduce liquid flow through the pores. Coatings that may be used include, but are not limited to, PTFE, a crosslinked siloxane, perfluorinated polymers, functionalized nanoparticles, and the like to prevent liquid flow through the pores.

Referring to FIG. 2B with respect to membrane contactor 201A of FIG. 2C, membrane contactor 201A may be positioned as membrane contactor 201. In this configuration, membrane contactor 201A is configured to receive dehumidified air stream 212 as a first fluid stream and a liquid sorbent stream from cooler 228 as a second fluid stream. In the example of FIG. 2B, port 258A may be configured to receive dehumidified air stream 212 and port 258B may be configured to discharge decontaminated air stream 216; ports 260A and 260B may each be configured to discharge contaminant stream 230; and port 262A may be configured to receive liquid sorbent from cooler 228 and port 262B may be configured to discharge liquid sorbent to pump 226. Pump 226 may circulate the liquid sorbent through membrane contactor 201, such that the liquid sorbent may be well mixed, such as at turbulent flow.

On a gas phase side, membrane contactor 201A is configured to receive dehumidified air from dehumidified air stream 212 that includes carbon dioxide from cabin 102. Hollow fiber membrane 250 is configured to flow (e.g., provide or direct flow of) dehumidified air from dehumidified air stream 212 on a gas phase side (e.g., a tube side) of first set of fibers 252A and flow the liquid sorbent on a liquid phase side (e.g., a shell side) of membrane 250. Contaminants may pass through first set of fibers 252A of membrane 250 due to a concentration gradient between the dehumidified air and the liquid sorbent and become absorbed by the liquid sorbent, while the liquid sorbent may not substantially flow through the fibers of membrane 250. As a result, decontaminated air from decontaminated air stream 216 discharged from membrane contactor 210A may have a lower concentration of carbon dioxide than dehumidified air from dehumidified air stream 212 received by membrane contactor 210A. For example, decontaminated air stream 216 may have a concentration of carbon dioxide that is about 25% to about 99% less than a concentration of carbon dioxide in dehumidified air stream 212. Membrane contactor 201A is configured to discharge decontaminated air stream 216 back to membrane dehumidifier 210.

On a liquid phase side, membrane contactor 201A is configured to receive unloaded liquid sorbent, such as from liquid sorbent storage 224. The unloaded liquid sorbent may flow through membrane contactor 210A adjacent to first set of fibers 252A and absorb carbon dioxide and other gaseous contaminants from the dehumidified air through first set of fibers 252A of membrane 250 of membrane contactor 201A. The liquid sorbent may be maintained at a higher pressure than dehumidified air stream 212 to reduce or eliminate bubbling of dehumidified air into the liquid sorbent. As a result, the loaded liquid sorbent adjacent to first set of fibers 252A may have a higher concentration of carbon dioxide and other contaminants than the unloaded liquid sorbent received by membrane contactor 201A.

Membrane contactor 201A is also configured to desorb the carbon dioxide from the liquid sorbent into contaminant stream 230. On a liquid phase side, membrane contactor 112 is configured to flow loaded liquid sorbent adjacent to second set of fibers 252B and desorb carbon dioxide from the loaded liquid sorbent. Membrane contactor 201A includes second set of fibers 252B configured to flow the loaded liquid sorbent on one side (e.g., a shell side) of second set of fibers 252B of membrane 250, desorb carbon dioxide from the loaded liquid sorbent, and discharge contaminated air to contaminant stream 230 on an opposite side (e.g., a tube side) of second set of fibers 252B of membrane 250. Carbon dioxide may flow across second set of fibers 252B of membrane 250 due to a concentration gradient, while the liquid sorbent may not substantially flow across the fibers of membrane 250. As a result, unloaded liquid sorbent discharged from membrane contactor 201A may have a similar concentration of carbon dioxide as the liquid sorbent received by membrane contactor 201A. On a gas phase side, membrane contactor 201A is configured to discharge the carbon dioxide and other contaminants in contaminant stream 230.

Membrane contactor 201A may be configured for high mass transfer of contaminants into and from the liquid sorbent. Mass transfer may be affected by a variety of structural and operational parameters including, but not limited to, a pore size of pores in first set of fibers 252A and second set of fibers 252B, wettability of the pores of first set of fibers 252A and second set of fibers 252B by the liquid sorbent, presence of coatings on first set of fibers 252A and second set of fibers 252B, a temperature of the liquid sorbent, a flow rate of the liquid sorbent, a tube-side and shell-side surface area of first set of fibers 252A and second set of fibers 252B, a volume fraction of first set of fibers 252A and second set of fibers 252B within shell side volume 267, and the like. In some examples, first set of fibers 252A and second set of fibers 252B may be present at a volume fraction and distribution within shell side volume 267 such that flow of the liquid sorbent is turbulent on a shell side of fibers 252A and 252B.

First and second sets of fibers 252A and 252B may be intermixed and present at a volume ratio to improve an overall transfer of contaminants from dehumidified air stream 212 to contaminant stream 230. To improve the overall transfer, first set of fibers 252A and second set of fibers 252B may be present at different volume fractions within shell side volume 267 that relate to different rates of mass transfer of contaminants into and from the liquid sorbent. For example, if membrane contactor 201A operates at a lower temperature than a regular stripper, the stripping may be less effective than a regular stripper, such that a greater volume fraction of second set of fibers 252B may be helpful. However, less effective stripping may be compensated for by adding increasing a volume fraction of first set of fibers 252A, which may produce a higher concentration of contaminants in the liquid sorbent, making stripping at the lower temperature easier. As such, a relative volume fraction of first or second sets of fibers 252A or 252B may be selected based on desired operating conditions. While illustrated in FIG. 2C as individual fibers, each of first set of fibers 252A and 252B may include one or more bundles of fibers potted in tubesheets 254A, 254B, 256A, 256B. For example, inclusion of multiple bundles may result in improved mixing, such as due to higher tortuosity among the bundles of fibers and/or higher turbulence of the flow of the liquid sorbent.

Figure 2D:
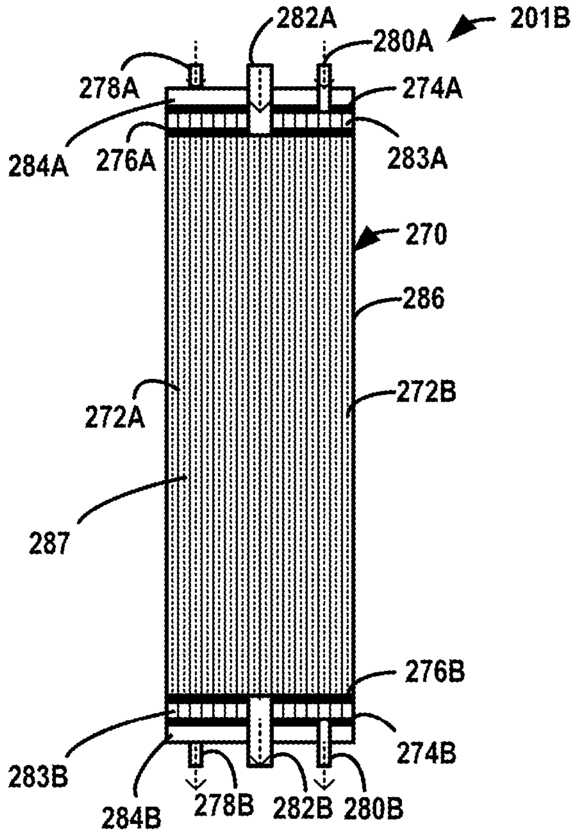
FIG. 2D is a cross-sectional side view diagram illustrating an example membrane contactor of FIG. 2A configured to scrub and strip one or more contaminants.

Membrane contactors described herein may be configured with a compact design. FIG. 2D is a cross-sectional side view diagram illustrating an example membrane contactor 201B configured to scrub and strip one or more contaminants. Unless otherwise stated, components of membrane contactor 201B of FIG. 2D may be similarly structured and operable as similarly-named components of membrane contactor 201A of FIG. 2C.

Hollow fiber membrane 270 includes a first set of fibers 272A bounded by a first set of tubesheets 274A and 274B and a second set of fibers 272B bounded by a second set of tubesheets 276A and 276B. Unlike tubesheets 254A, 254B, 256A, 256B of membrane contactor 201A of FIG. 2C, which are separated laterally, tubesheets 276A, 276B of membrane contactor 201B of FIG. 2D are nested within tubesheets 274A, 274B, such that first set of fibers 272A extends through second set of tubesheets 276A and 276B. As a result, first set of fibers 272A and second set of fibers 272B may be intermixed throughout a length of membrane contactor 201B in a shell side volume 287.

Housing 286, first set of tubesheets 274, and second set of tubesheets 276 define a first set of plenums 283A and 283B fluidically coupled to first set of fibers 272A and a second set of plenums 284A and 284B fluidically coupled to second set of fibers 272B. One or more of ports 278A, 278B, 280A, 280B, 282A, and 282B are arranged in-line with an axis of membrane contactor 201B. As a result, membrane contactor 201B may have a compact design that enables streamlined coupling of membrane contactor 201B and dense arrangement of multiple membrane contactors 201B.

Figure 3A:
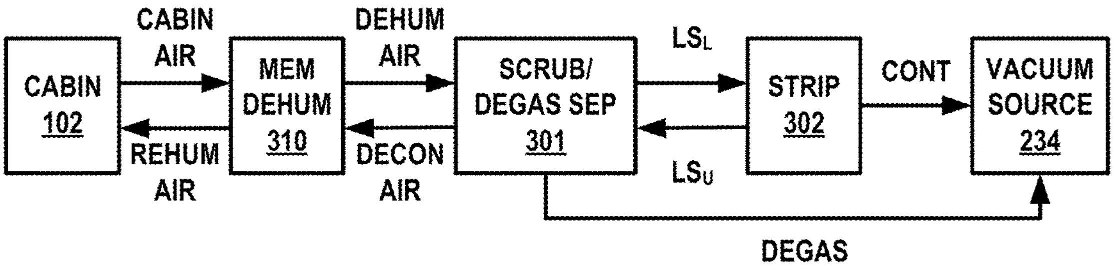
FIG. 3A is a block diagram illustrating an example separation system that includes a membrane contactor configured to scrub and degas one or more contaminants from a cabin air stream.

In some examples, membrane contactors described herein may provide a first stage of desorption of a portion of the contaminants, followed by one or more further stages of desorption. FIG. 3A is a block diagram illustrating an example separation system that includes a membrane contactor 301 ("SCRUB/DEGAS SEP") configured to scrub and degas one or more contaminants from a cabin air stream. In the example of FIG. 3A, a cabin air stream ("CABIN AIR") from cabin 102 is treated by an optional membrane contactor 310 to remove a portion of water vapor and discharged as a dehumidified air stream ("DEHUM AIR") to membrane contactor 301.

Membrane contactor 301 is configured to receive the dehumidified air stream and a liquid sorbent stream ("$LS_U$") that includes a liquid sorbent having a low concentration of contaminants. Membrane contactor 301 is configured to absorb one or more components from the dehumidified air stream into the liquid sorbent prior to discharging the air stream and desorb at least a portion of the components from the liquid sorbent into a contaminant stream ("DEGAS"). These components may include oxygen, nitrogen, and other gases with a relatively low solubility in the liquid sorbent. In some instances, the components may include contaminants with relatively high solubility in the liquid sorbent, such as alcohols or water, which may be at least partially degassed at a lower temperature. A temperature at which these secondary contaminants may be desorbed may be similar to a temperature at which contaminants are ideally absorbed, such, as between about 10° C. and about 25° C. As a result, membrane contactor 301 may be operated at a relatively cool temperature compared to, for example, membrane contactor 201, which may operate at a higher temperature that balances absorption with desorption of more soluble contaminants.

Another membrane contactor operating as a stripper 302 is configured to receive liquid sorbent still loaded with primary contaminants ("$LS_L$"), such as carbon dioxide and water, desorb these contaminants from the liquid sorbent into a contaminant stream ("CONT"), and discharge liquid sorbent that is unloaded for further absorption at membrane contactor 301. Vacuum source 234 may provide a vacuum on both membrane contactor 301 and stripper 302 to aid in desorbing the contaminants from the liquid sorbent. Membrane contactor 301 is configured to discharge a decontaminated air stream ("DECON AIR") to membrane dehumidifier 210 for humidification, and membrane dehumidifier 210 is configured to discharge a rehumidified air stream ("REHUM AIR") to cabin 102.

By incorporating degassing operations into a scrubber, separation system 300 may have a higher operating life, have a lower overall weight, and/or use less power. As one example, desorption of contaminants in stripper 302 may be more efficient due to a lower concentration of other contaminants in the liquid sorbent. As another example, oxygen present during heating of the liquid sorbent can lead to oxidative degradation of the liquid sorbent or a promoter in the liquid sorbent mixture. Degassing before heating may slow down this degradation. More generically, trace contaminants may react at elevated stripping temperatures. In some instances, the contaminants may be stripped and degassed using a same pressure source (e.g., vacuum pump), and subsequently recombined, thereby reducing degradation of the liquid sorbent or reaction of the contaminants until recombination. In other instances, the contaminant stream may have purity requirements that requires the degassed components to be removed into a separate stream and not recombined with the stripper's product.

Figure 3B:
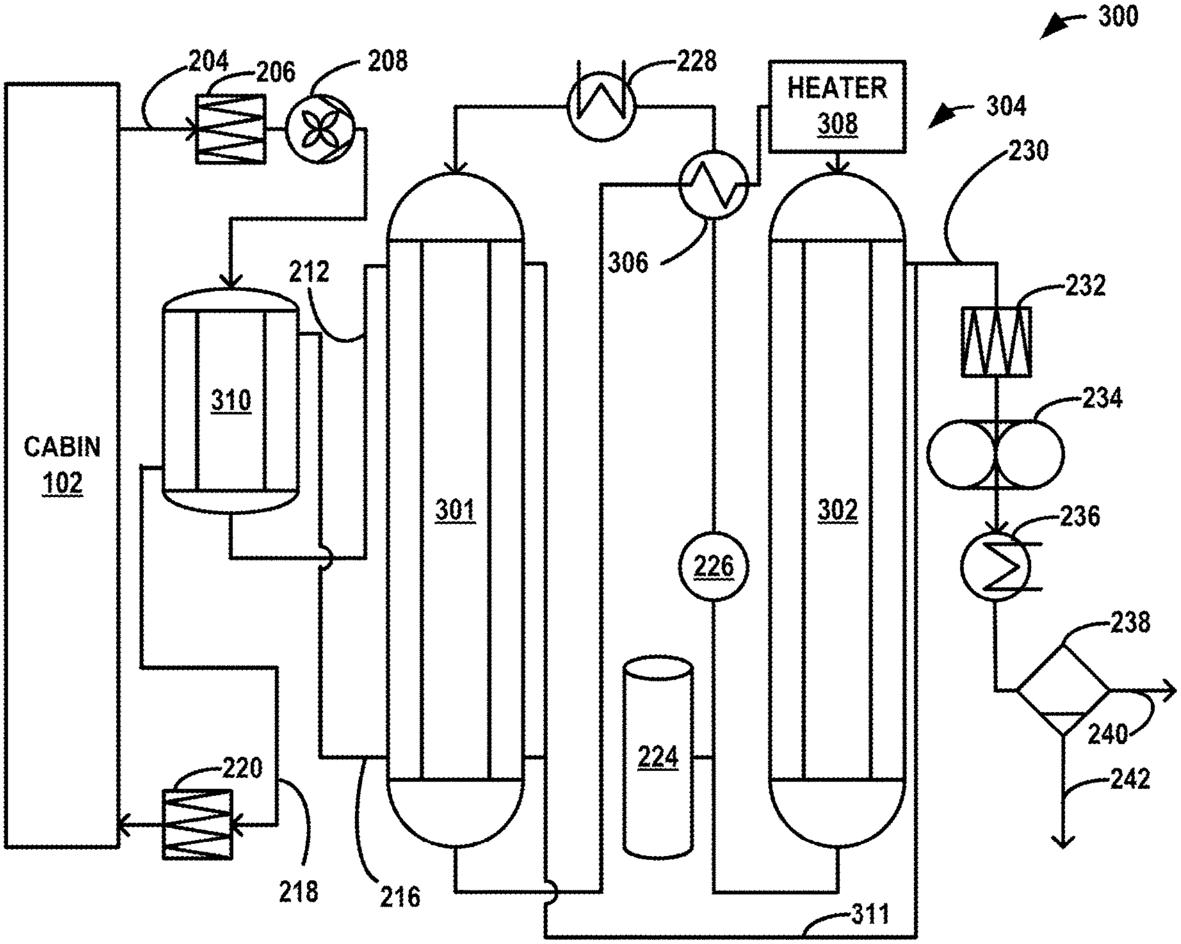
FIG. 3B is a schematic diagram illustrating the example separation system of FIG. 3A that includes a membrane contactor configured to scrub and degas one or more contaminants from a cabin air stream.

FIG. 3B is a schematic diagram illustrating an example separation system 300 that includes membrane contactor 301 configured to scrub and degas one or more contaminants from cabin air stream 204. Like membrane contactor 201, membrane contactor 301 is configured to absorb contaminants, including carbon dioxide, from dehumidified air stream 212 into the liquid sorbent and discharge decontaminated air stream 216 to membrane dehumidifier 210. Membrane contactor 301 is also configured to desorb a first portion of the contaminants from the liquid sorbent into degas stream 311. However, this first portion may include gases, such as oxygen gas and nitrogen gas, which may be less soluble in the liquid sorbent at the relatively low temperatures experienced during absorption.

Separation system 300 also includes additional membrane contactors, including stripper 302. Stripper 302 is configured to desorb a second portion of the contaminants, including carbon dioxide, from the degassed liquid sorbent into contaminant stream 230. On a liquid phase side, stripper 302 is configured to receive loaded liquid sorbent from membrane contactor 301 and desorb carbon dioxide from the loaded liquid sorbent. Stripper 302 includes one or more membranes, each configured to flow the loaded liquid sorbent on one side (e.g., a shell side) of the membrane and contaminated air to contaminant stream 230 on an opposite side (e.g., a tube side) of the membrane. Carbon dioxide may flow across fibers of the membrane due to a concentration gradient, while the second liquid sorbent may not substantially flow across the fibers of the membrane. As a result, unloaded liquid sorbent discharged from stripper 302 may have a lower concentration of carbon dioxide than the loaded liquid sorbent received by stripper 302. On a gas phase side, stripper 302 is configured to discharge the carbon dioxide in contaminant stream 230. Contaminant stream 230 may be continuously removed from stripper 302 to assist migration of the carbon dioxide from the loaded liquid sorbent into contaminant stream 230.

Separation system 300 includes liquid sorbent loop 304 configured to circulate liquid sorbent between membrane contactor 301 and stripper 302. For example, pump 226 may pump unloaded liquid sorbent from an outlet of membrane contactor 301 to an inlet of stripper 302. Unloaded liquid sorbent may include unused liquid sorbent free of contaminants or regenerated liquid sorbent having a lower concentration of contaminants than the loaded liquid sorbent. In some examples, the loaded liquid sorbent may be preheated by a heat exchanger 306 and/or a heater 308 prior to entry into stripper 302 to reduce a solubility of the contaminants in the liquid sorbent.

Figure 3C:
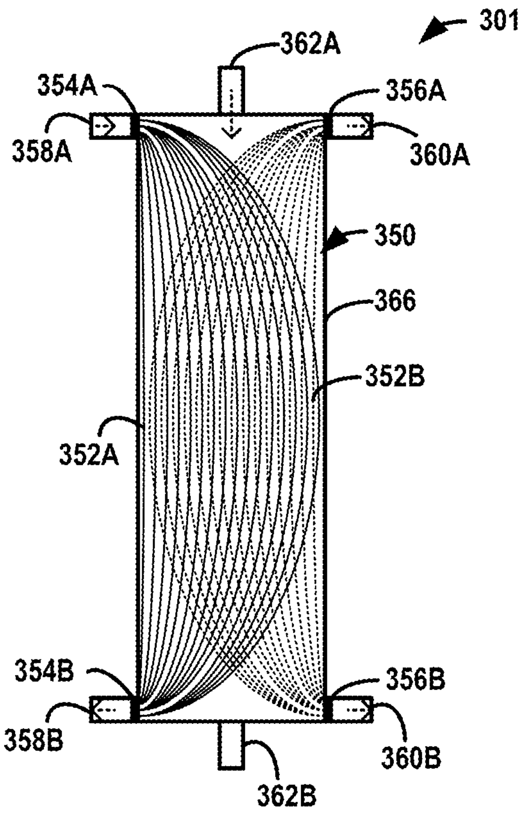
FIG. 3C is a cross-sectional side view diagram illustrating an example membrane contactor of FIG. 3A configured to scrub and degas one or more contaminants.

FIG. 3C is a cross-sectional side view diagram illustrating an example membrane contactor 301 configured to scrub and degas one or more contaminants. Membrane contactor 301 includes a hollow fiber membrane 350. Hollow fiber membrane 350 may include a cylindrical module filled with parallel or woven hollow porous fibers forming a hydrophobic porous membrane. In the example of FIG. 3C, hollow fiber membrane 350 includes a first set of fibers 352A bounded by a first set of tubesheets 354A and 354B and a second set of fibers 352B bounded by a second set of tubesheets 356A and 356B. Each tubesheet 354A, 354B, 356A, 356B may include an epoxy or other substantially nonporous material for coupling fibers 352A or 352B and sealing the ends of fibers 352A or 352B with a respective port. First set of fibers 352A is configured to transfer one or more contaminants from a first gas stream into a shell side volume. Second set of fibers 352B is configured to transfer the one or contaminants from the shell side volume into a second gas stream.

Membrane contactor 301 includes a housing 366. Housing 366 defines a shell side volume in which one or more hollow fiber membranes 350 may be positioned. Housing 366 includes a first set of gaseous ports 358A and 358B fluidically coupled to first set of fibers 352A and a second set of gaseous ports 360A and 360B fluidically coupled to second set of fibers 352B, and a set of liquid ports 362A and 362B fluidically coupled to the shell side volume. One of gaseous ports 358A or 358B is fluidically coupled to receive a gas stream, while the other of gaseous ports 358A or 358B is fluidically coupled to discharge a gas stream. At least one of gaseous ports 360A or 360B is fluidically coupled to discharge a gaseous stream, while the other of gaseous ports 360A or 360B may be fluidically coupled to receive a gaseous stream, such as a sweep gas stream.

Referring to FIG. 3B, membrane contactor 301 is configured to receive dehumidified air stream 212 as a first fluid stream and a liquid sorbent stream as a second fluid stream. In the example of FIG. 3C, port 358A may be configured to receive dehumidified air stream 212 and port 358B may be configured to discharge decontaminated air stream 216; ports 360A and 360B may each be configured to discharge degas stream 311; port 362A may be configured to receive liquid sorbent from cooler 228; and port 362B may be configured to discharge liquid sorbent to pump 226. Membrane contactor 310 is configured to absorb contaminants from dehumidified air stream 212 into the liquid sorbent of the liquid sorbent stream in shell side volume 108 and desorb at least a portion of the one or more contaminants from the liquid sorbent into degas stream 311. Pump 226 may circulate the liquid sorbent through membrane contactor 301, such that the liquid sorbent may be well mixed, such as at turbulent flow.

First set of fibers 352A may operate similarly to first set of fibers 252A to absorb contaminants into the liquid sorbent. However, second set of fibers 352B may be configured to desorb a first portion of contaminants to lower a load on a downstream membrane contactor. On a liquid phase side, membrane contactor 301 is configured to flow loaded liquid sorbent adjacent to second set of fibers 352B and desorb a portion of the contaminants from the loaded liquid sorbent. This portion of contaminants may include a higher mix of secondary gases, such as oxygen and nitrogen, than the portion of contaminants desorbed by stripper 302. These secondary contaminants may be relatively insoluble compared to primary contaminants like carbon dioxide, such that desorbing these contaminants may function to degas the liquid sorbent prior to primary desorption of the carbon dioxide in stripper 302. Contaminants may flow across second set of fibers 352B of membrane 350 due to a concentration gradient, while the liquid sorbent may not substantially flow across the fibers of membrane 350. As a result, liquid sorbent discharged from membrane contactor 301 may have a reduced concentration of contaminants as the liquid sorbent received by membrane contactor 301. On a gas phase side, membrane contactor 301 is configured to discharge the contaminants in degas stream 311. Degas stream 311 may be continuously removed from membrane contactor 301 to assist migration of the contaminants from the loaded liquid sorbent into degas stream 311.

While second set of fibers 352B are illustrated as having a same or similar number of fibers as first set of fibers 352A, a relative volume fraction (or corresponding surface area) or first and second sets of fibers 352A and 352B may be different. For example, degassing oxygen, nitrogen, or other permanent gases in the liquid sorbent may be accomplished with a lower membrane surface area than scrubbing carbon dioxide, such that a volume fraction or surface area of second set of fibers 352B may be less than a volume fraction or surface area of first set of fibers 352A.

Figure 4A:
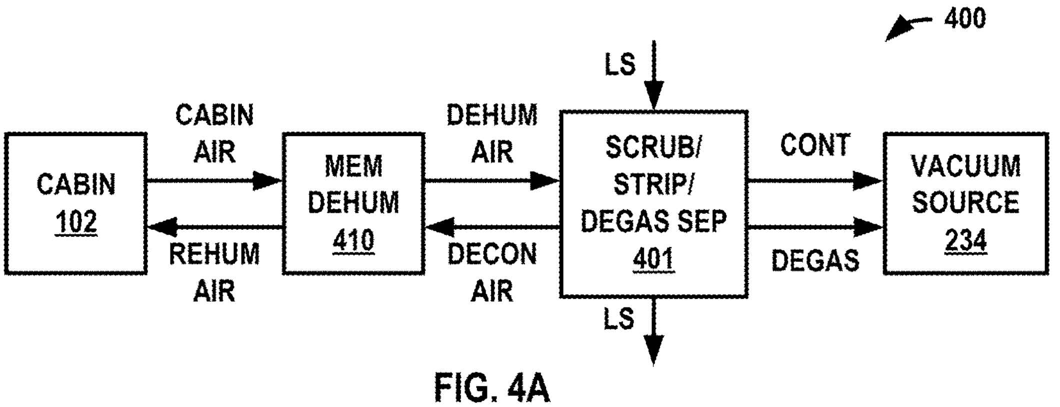
FIG. 4A is a block diagram illustrating an example separation system that includes a membrane contactor configured to scrub, strip, and degas one or more contaminants from a cabin air stream.

In some examples, membrane contactors described herein may desorb different contaminants at different conditions within a same membrane contactor. FIG. 4A is a block diagram illustrating an example separation system 400 that includes a membrane contactor 401 ("SCRUB/STRIP/DEGAS SEP") configured to scrub, strip, and degas one or more contaminants from a cabin air stream. In the example of FIG. 4A, a cabin air stream ("CABIN AIR") from cabin 102 is treated by an optional membrane dehumidifier 410 to remove a portion of water vapor and discharged as a dehumidified air stream ("DEHUM AIR") to membrane contactor 401. Membrane contactor 401 is configured to receive the dehumidified air stream and a liquid sorbent stream ("LS") that includes a liquid sorbent. Membrane contactor 401 is configured to absorb one or more contaminants from the dehumidified air stream into the liquid sorbent, desorb at least a portion of the contaminants from the liquid sorbent into a degas stream ("DEGAS") at a first set of conditions, and desorb at least a portion of the contaminants from the liquid sorbent into a contaminant stream ("CONT") at a second set of conditions. The first and second sets of conditions may differ based on a temperature of the liquid sorbent, a concentration of contaminants in the liquid sorbent, or other condition that may affect a rate of mass transfer of contaminants between the liquid sorbent and the hollow fiber membrane of membrane contactor 401. As a result, the composition of the degas stream is different from the composition of the contaminant stream, and may be combined upstream of vacuum source 110. Vacuum source 110 may provide a vacuum on membrane contactor 401 to aid in desorbing the one or more contaminants from the liquid sorbent. Membrane contactor 401 is configured to discharge a decontaminated air stream ("DECON AIR") to membrane dehumidifier 410 for humidification, and membrane dehumidifier 410 is configured to discharge a rehumidified air stream ("REHUM AIR") to cabin 102.

Figure 4B:
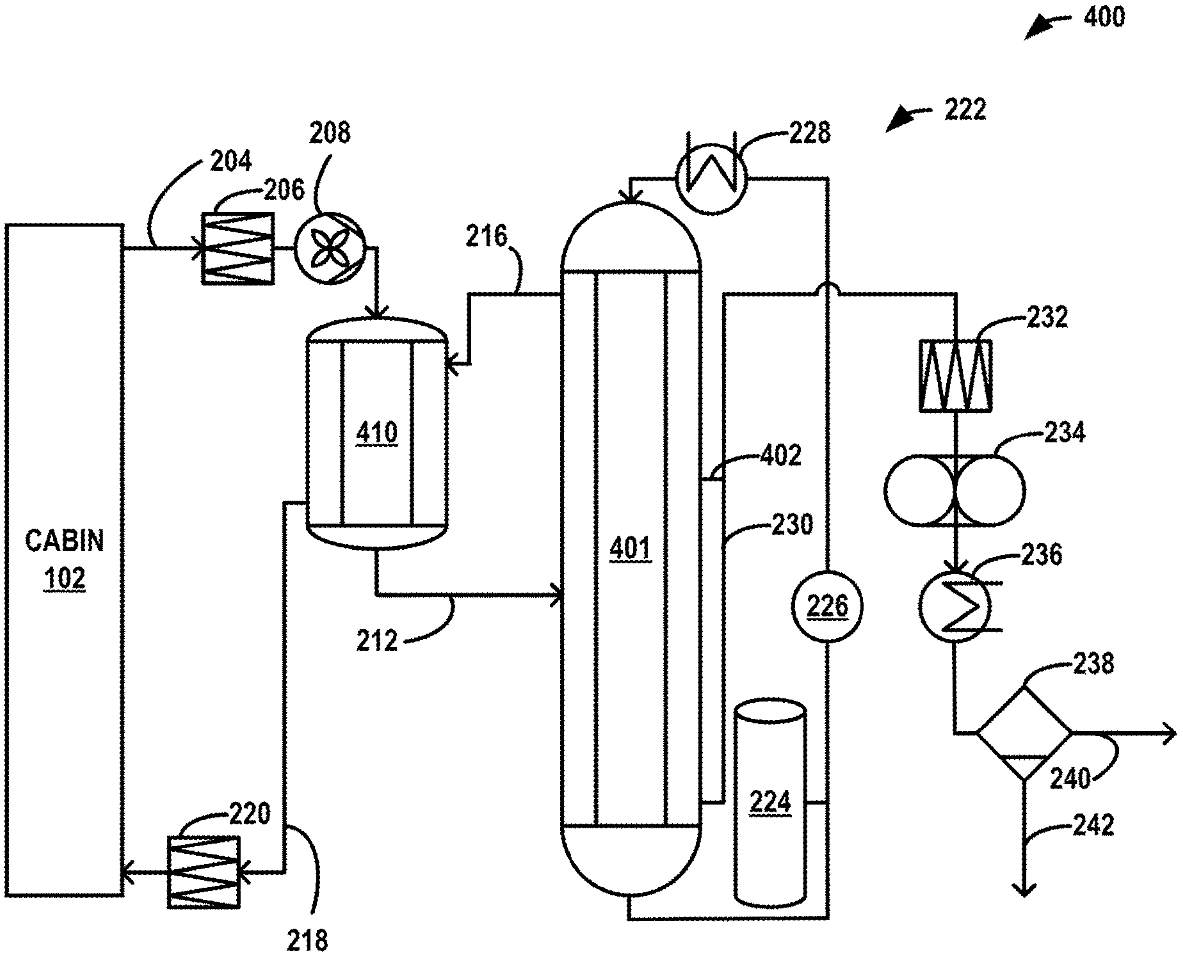
FIG. 4B is a schematic diagram illustrating the example separation system of FIG. 4A that includes a membrane contactor configured to scrub, strip, and degas one or more contaminants from a cabin air stream.

FIG. 4B is a schematic diagram illustrating the example separation system 400 of FIG. 4A that includes membrane contactor 401 configured to scrub, strip, and degas one or more contaminants from a cabin air stream. Like membrane contactor 201 of FIG. 2B, membrane contactor 401 is configured to absorb carbon dioxide and other contaminants from dehumidified air stream 212 into the liquid sorbent and discharge decontaminated air stream 216 back to membrane dehumidifier 210. However, rather than discharge desorbed contaminants in a same stream, membrane contactor 401 is also configured to desorb a first portion of contaminants from the liquid sorbent into a degas stream 402 and desorb a second portion of contaminants, including the carbon dioxide, from the liquid sorbent into contaminant stream 230.

Figure 4C:
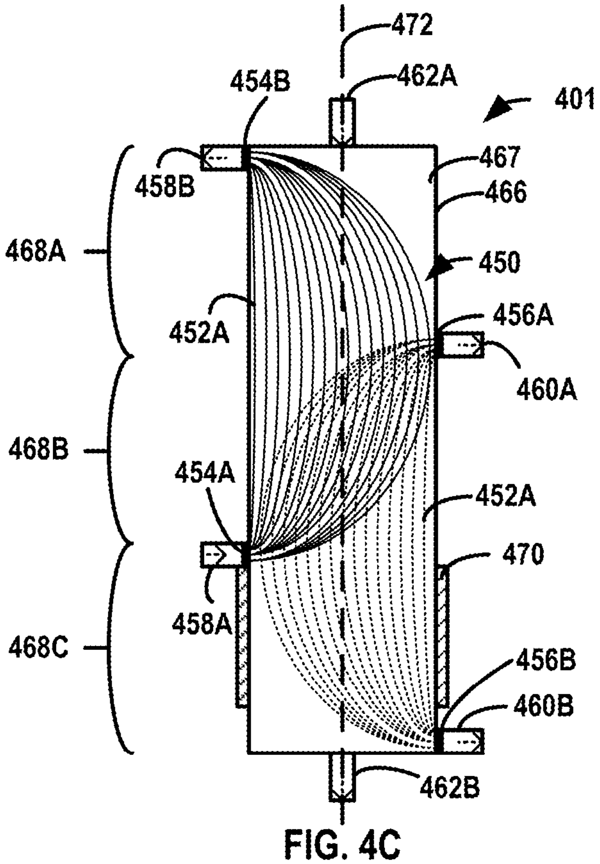
FIG. 4C is a cross-sectional side view diagram illustrating an example membrane contactor of FIG. 4A configured to scrub, strip, and degas one or more contaminants.

FIG. 4C is a cross-sectional side view diagram illustrating an example membrane contactor 401 configured to scrub, strip, and degas one or more contaminants. Membrane contactor 401 includes a hollow fiber membrane 450. Hollow fiber membrane 450 may include a cylindrical module filled with parallel or woven hollow porous fibers forming a hydrophobic porous membrane. In the example of FIG. 4C, hollow fiber membrane 450 includes a first set of fibers 452A bounded by a first set of tubesheets 454A and 454B and a second set of fibers 452B bounded by a second set of tubesheets 456A and 456B. First set of fibers 452A is configured to transfer one or more contaminants from a first gas stream into a shell side volume 467. However, second set of fibers 452B is configured to transfer the one or contaminants from shell side volume 467 into separate gas streams.

Membrane contactor 401 includes a housing 466. Housing 466 defines shell side volume 467 in which one or more hollow fiber membranes 450 may be positioned. Housing 466 includes liquid ports 462A, 462B positioned at different ends of membrane contactor 401 and gaseous ports 458A, 458B, 460A, 460B positioned at different axial locations along an axis 472 of membrane contactor 401. For example, port 458B may be positioned near a top of membrane contactor 401 and configured to discharge decontaminated air stream 416; port 460A may be positioned near an upper middle of membrane contactor 401 and configured to receive dehumidified air stream 412; port 458A may be positioned near a lower middle of membrane contactor 401 and configured to discharge degas stream 402, and port 260B may be positioned near a bottom of membrane contactor 401 and configured to discharge contaminated stream 430. Due to the differing positions of ports 458A, 458B, 460A, 460B, first set of fibers 452A is positioned at least partially upstream of second set of fibers 452B with respect to a flow of the liquid sorbent.

On a liquid phase side, membrane contactor 401 is configured to flow loaded liquid sorbent adjacent to second set of fibers 452B that extend down membrane 450 in a general direction of flow of the liquid sorbent. As a result, different portions of second set of fibers 452B may be subject to different operating conditions that result in different rates of desorption for different contaminants. For example, an upstream portion of second set of fibers 452B may be maintained at a first set of conditions that is more conducive to desorption of a first portion of the contaminants. This first set of conditions may include a relatively low temperature, as absorption of the contaminants into the liquid sorbent at the first set of fibers may be improved at lower temperatures. On the other hand, a downstream portion of second set of fibers 452B may be maintained at a second set of conditions that is more conducive to desorption of a second portion of the contaminants, such as carbon dioxide. The second set of conditions may include a relatively high temperature, as desorption of the contaminants from the liquid sorbent may be improved at higher temperatures. Both contaminant stream 230 and degas stream 402 may be continuously removed from membrane contactor 401 to assist migration of the carbon dioxide from the loaded liquid sorbent into contaminant stream 230 and degas stream 402.

The different conditions of the liquid sorbent within membrane contactor 401 result in different functional regions. These functional regions may include an absorption region 468A primarily absorbing contaminants into a liquid sorbent, a degassing region 468B primarily desorbing a first portion of contaminants from the liquid sorbent, and a desorption region 468C primarily desorbing a second set of contaminants. For example, liquid sorbent flowing between port 458B and 460A may primarily absorb contaminants from first set of fibers 452A as part of absorption region 468A. The liquid sorbent, now loaded with contaminants, flowing between port 460A and 458A in degassing region 468B may desorb a relatively high proportion of contaminants that are less soluble in the liquid sorbent. The liquid sorbent flowing between port 458A and port 460B in desorption region 468C, now desorbed of secondary contaminants like nitrogen and oxygen, may desorb a majority of the primary contaminants absorbed into the liquid sorbent, such as carbon dioxide and water vapor.

To aid in desorption, desorption region 468C may be maintained at different conditions than degassing region 468B. For example, membrane contactor 401 may include one or more heat sources 470, such as heat traces, configured to heat the liquid sorbent in desorption region 468C and maintain a temperature of the liquid sorbent proximate to first set of fibers 452A higher than a temperature of the liquid sorbent proximate to second set of fibers 452B. By raising a temperature of the liquid sorbent, contaminants such as carbon dioxide may be less soluble, thereby encouraging desorption from the liquid sorbent. In contrast, degassing region 468B may be maintained at lower temperatures similar to absorption region 468A.

Figure 4D:
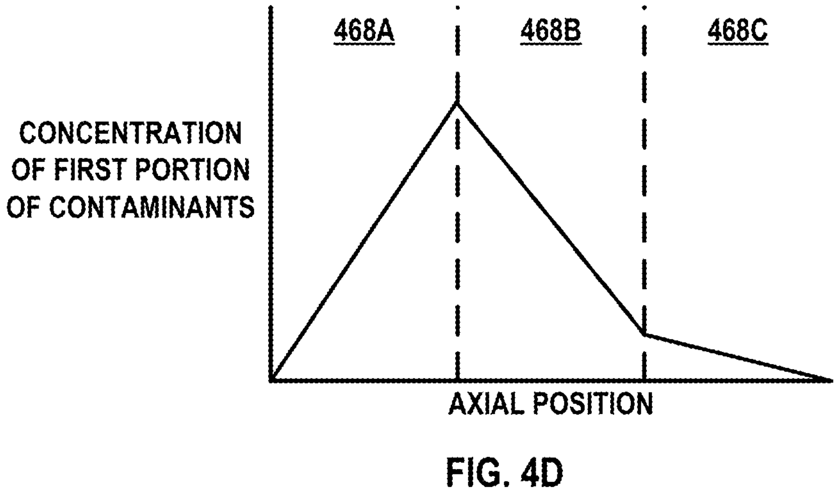
FIG. 4D is a graph of concentration of a first portion of contaminants in a liquid sorbent along an axis of the membrane contactor of FIG. 4C.
Figure 4E:
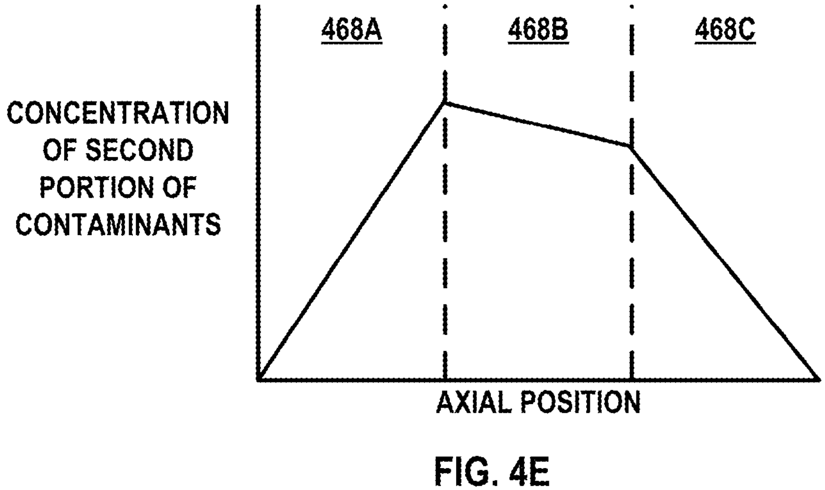
FIG. 4E is a graph of concentration of a second portion of contaminants in a liquid sorbent along an axis of the membrane contactor of FIG. 4C.
Figure 4F:
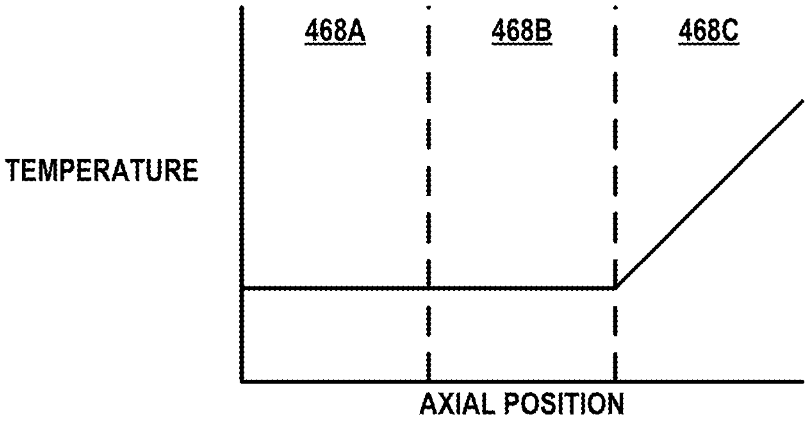
FIG. 4F is a graph of concentration of a temperature of a liquid sorbent along an axis of the membrane contactor of FIG. 4C.

FIGS. 4D-4F are example graphs illustrating different conditions of the liquid sorbent in each of regions 468A-468C during operation of membrane contactor 401. In absorption region 468A, a concentration of the first portion of contaminants and the second portion of contaminants increases due to absorption of the contaminants from the air stream. The temperature may be relatively low to increase a solubility of the contaminants into the liquid sorbent. In degassing region 468B, a concentration of the first portion of contaminants may decrease at a higher rate than the second portion of contaminants due to conditions within the liquid sorbent. For example, the temperature of the liquid sorbent may be maintained relatively low to desorb a greater proportion of the first portion of contaminants relative to the second portion of contaminants. In desorption region 468C, a concentration of the second portion of contaminants may decrease at a higher rate than the second portion of contaminants at least partly due to condition within the liquid sorbent. For example, the temperature of the liquid sorbent may be raised relative to degassing region 468B to increase desorption of the second portion of the contaminants. In this way, membrane contactor 401 may achieve a higher overall absorption and desorption of contaminants than a membrane contactor that maintains the liquid sorbent at relatively uniform conditions.

Figure 5A:
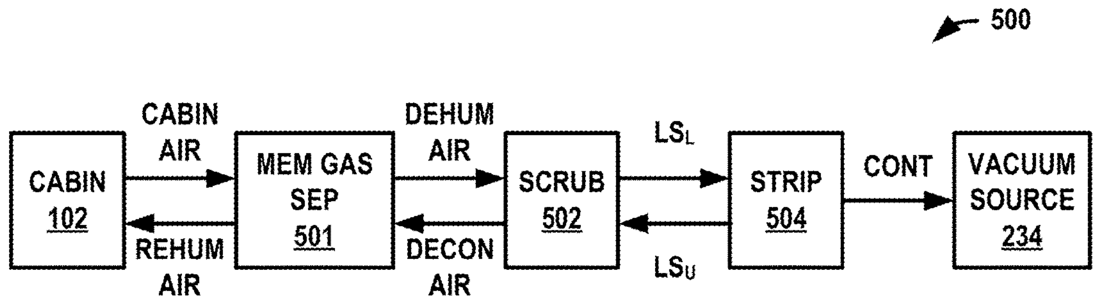
FIG. 5A is a block diagram illustrating an example separation system that includes a membrane dehumidifier configured to remove humidity from a cabin air stream.

Membrane separators described herein may also be configured to function as membrane gas separators that transfer contaminants between a first gas stream and a second gas stream. FIG. 5A is a block diagram illustrating an example separation system 500 that includes a membrane gas separator 501 ("MEM GAS SEP") configured to remove humidity from a cabin air stream. In the example of FIG. 5A, a cabin air stream ("CABIN AIR") from cabin 102 is treated by a membrane gas separator 501. Membrane gas separator 501 removes a portion of water vapor from the cabin air stream and discharges a dehumidified air stream ("DEHUM AIR") to a scrubber 502. Scrubber 502 is configured to receive unloaded liquid sorbent loaded ($LS_U$), absorb one or more contaminants from the dehumidified air stream into the liquid sorbent, and discharge loaded liquid sorbent ($LS_L$). Stripper 504 is configured to receive loaded liquid sorbent, desorb at least a portion of the contaminants from the liquid sorbent into a contaminants stream ("CONT"), and discharge unloaded liquid sorbent for further absorption at scrubber 502. Vacuum source 110 may provide a vacuum on stripper 504 to aid in desorbing the contaminants from the liquid sorbent. Scrubber 502 is configured to discharge a decontaminated air stream ("DECON AIR") to membrane gas separator 501 for humidification, and membrane gas separator 501 is configured to discharge a rehumidified air stream ("REHUM AIR") to cabin 102.

Figure 5B:
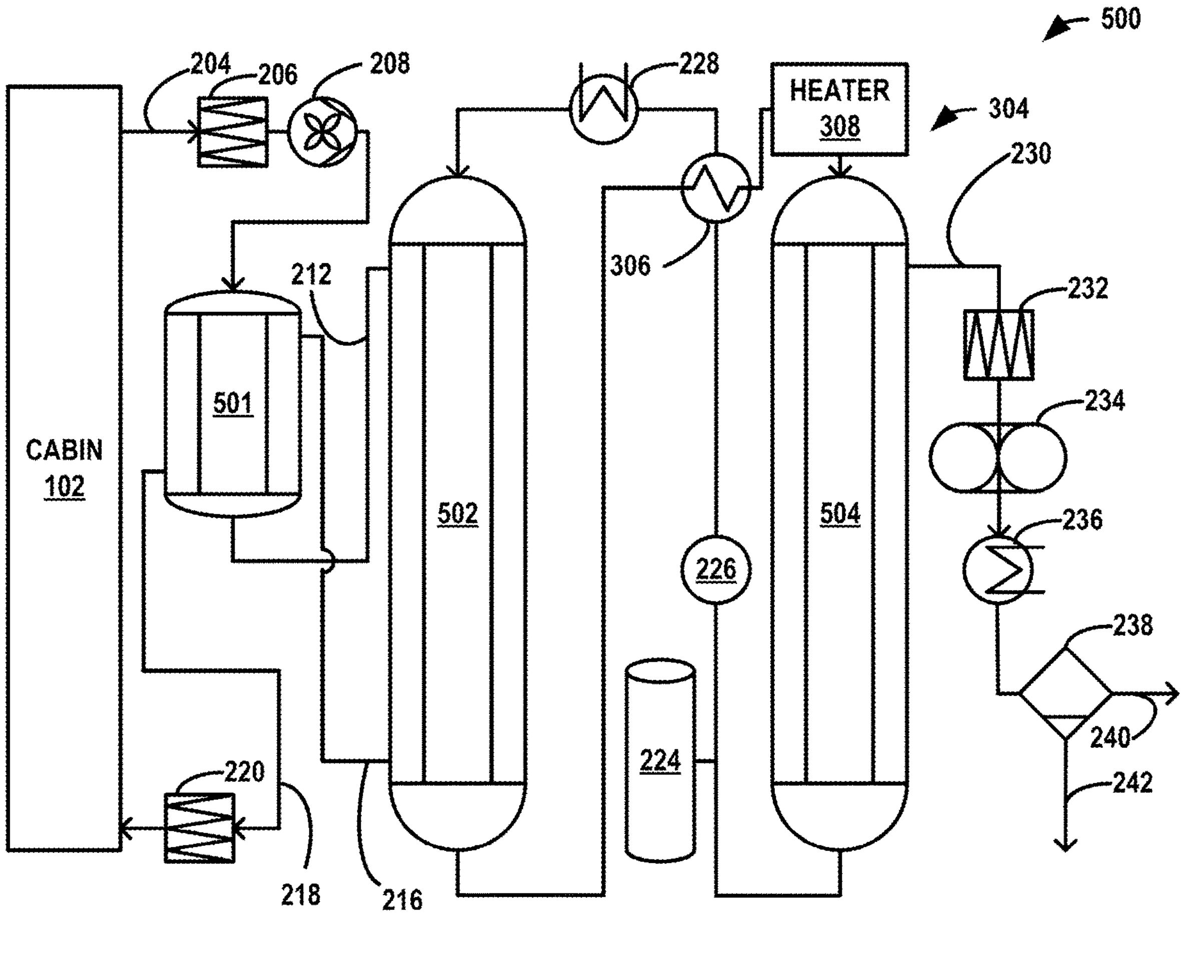
FIG. 5B is a schematic diagram illustrating the example separation system of FIG. 5A that includes a membrane dehumidifier configured to remove humidity from a cabin air stream.

FIG. 5B is a schematic diagram illustrating an example separation system 500 that includes membrane gas separator 501 configured to remove humidity from cabin air stream 204. Membrane gas separator 501 is configured to function as a membrane dehumidifier to return humidity from cabin air stream 204 to a decontaminated air stream 216 and discharge a dehumidified air stream 212 to membrane contactor 201. As a result, dehumidified air from dehumidified air stream 212 discharged from dehumidifier 210 may have a lower humidity than cabin air from cabin air stream 204 received by dehumidifier 210. For example, dehumidified air stream 212 may have a humidity that is between about 0% and about 35% relative humidity. However, rather than directly transfer humidity across a single set of fibers, membrane gas separator 501 includes a first set of fibers that discharges the gas stream into a shell side volume that is exposed to a second set of fibers. As a result, membrane gas separator may more effectively manage humidity than a membrane dehumidifier that directly exchanges water vapor across a single set of tubes (e.g., tube-side of one gas stream to shell-side of another gas stream).

Separation system 500 may include stripper 504, liquid sorbent loop 304, and other components similar to separation system 300. Additionally, separation system 500 includes another membrane contactor configured to operate as scrubber 502. Scrubber 502 is configured to absorb one or more contaminants from cabin air stream 204 into the liquid sorbent and discharge decontaminated air stream 216 to cabin 102. Scrubber 502 includes one or more separation membranes, each configured to flow (e.g., provide or direct flow of) cabin air from cabin air stream 204 on a gas phase side (e.g., a tube side) of the respective membrane and flow the liquid sorbent on a liquid phase side (e.g., a shell side) of the membrane. On a gas phase side, scrubber 502 is configured to receive cabin air from cabin air stream 204 that includes contaminants from cabin 102. Contaminants may pass through the membrane due to a concentration gradient between the cabin air and the liquid sorbent and become absorbed by the liquid sorbent, while the liquid sorbent may not substantially flow through the membrane. As a result, decontaminated air from decontaminated air stream 216 discharged from scrubber 502 may have a lower concentration of contaminants than dehumidified air from dehumidified air stream 212 received by scrubber 502. Scrubber 502 is configured to discharge decontaminated air stream 216 to cabin 102 via membrane gas separator 501. On a liquid phase side, scrubber 502 is configured to receive unloaded liquid sorbent, such as from a liquid sorbent storage 224. The unloaded liquid sorbent may flow through scrubber 502 and absorb carbon dioxide and other gaseous contaminants from cabin air through the membrane(s) of scrubber 502. As a result, the loaded liquid sorbent discharged from scrubber 502 may have a higher concentration of contaminants than the unloaded liquid sorbent received by scrubber 502. Scrubber 502 may discharge the loaded liquid sorbent containing the contaminants to stripper 504.

Figure 5C:
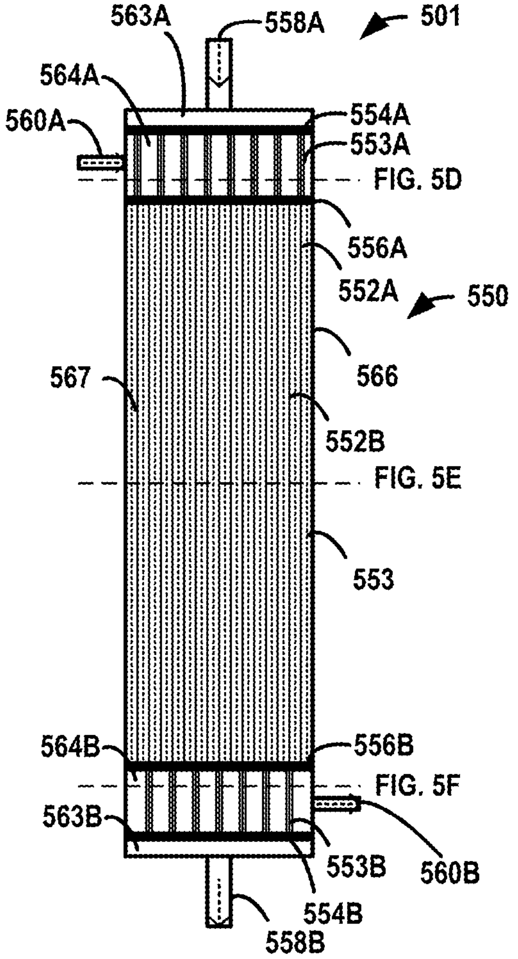
FIG. 5C is a cross-sectional side view diagram illustrating an example membrane gas separator configured to remove humidity.

FIG. 5C is a cross-sectional side view diagram illustrating an example membrane gas separator 501 configured to remove humidity. Membrane gas separator 501 includes a housing 566. Housing 566 defines a shell side volume 567 in which one or more hollow fiber membranes 550 may be positioned. In the example of FIG. 5C, hollow fiber membrane 550 includes a first set of fibers 552 and a second set of fibers 553. First set of fibers 552 is configured to discharge a first gas stream, such as a cabin air stream, into a shell side volume 567 and discharge the first gas stream, such as a dehumidified air stream, from shell side volume 567, such that shell side volume 567 may include the first gas stream. Second set of fibers 553 is configured to transfer one or more components from the first gas stream in shell side volume 567 into the second gas stream, such as a decontaminated air stream intended for rehumidification. Housing 566 includes a first set of gaseous ports 558A and 558B fluidically coupled to first set of fibers 552 and a second set of gaseous ports 560A and 560B fluidically coupled to second set of fibers 553. Gaseous ports 558A and 558B are configured to receive and discharge a first gas stream, while gaseous ports 560A and 560B are configured to receive and discharge a second gas stream.

Referring to FIG. 5B, membrane contactor 501 is configured to receive cabin air stream 204 as a first fluid stream and a decontaminated air stream 216 as a second fluid stream. In the example of FIG. 5C, port 558A may be configured to receive cabin air stream 204 and port 558B may be configured to discharge dehumidified air stream 212; and port 560A may be configured to receive decontaminated air stream 216 and port 560B may be configured to discharge rehumidified air stream 218.

On one side, membrane gas separator 501 is configured to receive cabin air stream 204 as a feed gas stream in first set of fibers 552 and discharge dehumidified air stream 212 from first set of fibers 552. On an opposite side, membrane gas separator 501 is configured to receive decontaminated air stream 216 from scrubber 502 by second set of fibers 553 and discharge rehumidified air to rehumidified air stream 218 from second set of fibers 553 having a higher humidity, such that rehumidified air stream 218 may have a higher humidity than the humidity of decontaminated air stream 216. For example, rehumidified air stream 218 may have a humidity that is selected to maintain a humidity of cabin 102 between about 5% and about 75% relative humidity. The tube side of both the first set of fibers and the second set of fibers is exposed to a shell side volume 567 of membrane gas separator 501. However, first set of fibers 552 may be configured such that the first gas stream discharges from first set of fibers 552 into shell side volume 567. Water vapor transfers from the first gas stream in shell side volume 567 to a second gas stream in second set of fibers 553.

Second set of fibers 553 may be bounded by tubesheets 556A and 556B and fluidically coupled to ports 560A and 560B via inlet plenum 564A and outlet plenum 564B. To better control conditions within shell side volume 567, first set of fibers 552 includes an inlet subset of fibers 552A and an outlet subset of fibers 552B. Rather than extend from inlet plenum 563A to outlet plenum 563B, inlet subset of fibers 552A may be fluidically coupled to inlet plenum 563A (e.g., bounded by tubesheet 554A) and shell side volume 567 (e.g., bounded and blocked by tubesheet 556B), while outlet subset of fibers 552B may be fluidically coupled to shell side volume 567 (e.g., bounded and blocked by tubesheet 556A) and outlet plenum 564B (e.g., bounded by tubesheet 554B). As a result, the first gas stream may flow from inlet plenum 563A, to inlet subset of fibers 552A, to shell side volume 567, to outlet subset of fibers 552B, and out outlet plenum 563B. Such permeation of the first gas stream through set of fibers 552 prior to and after discharge into shell side volume 567 may enable fine control of conditions in shell side volume 567.

The first and second sets of fibers 552 and 553 may have different properties, such as permeability, such that contaminants like water vapor pass through first set of fibers 552 and second set of fibers 553 at different rates. First set of fibers 552 may be configured to permit gases to flow relatively easily from within fibers to shell side volume 567. For example, first set of fibers 552 may have a substantially higher permeability than second set of fibers 553, such that the first gas stream may readily permeate through pores of the fibers into shell side volume 567. In contrast, second set of fibers 553 may be configured to selectively permeate one or more components, such as humidity, from shell side volume 567 to second gas stream. As such, second set of fibers 553 may have small or no pores, such that humidity or other relatively components may permeate through a solid membrane material. For example, second set of fibers 553 may be formed from a polymer with a molecular structure that is dense enough to significantly reduce permeation of larger molecules, but are sufficiently porous to allow smaller molecules such as water vapor to diffuse through the wall of the fiber. A wide variety of materials may be used for the hollow fibers including, but not limited to, polypropylene, polyvinylidene fluoride, polysulfone, polyimide, polytetrafluoroethylene, and the like. In some examples, hollow fibers used for first set of fibers 552 may be high permeability fibers, such as fiberglass tubes stiffened with epoxy.

During operation, the second gas stream may enter through port 560A into inlet plenum 564A, pass through a tube-side of second set of fibers 553 into outlet plenum 564B, and discharge from port 560B. The first gas stream may enter through port 558A into inlet plenum 563A, travel through a tube-side of inlet subset of fibers 552A, and permeate through inlet subset of fibers 552A into shell side volume 567. Within shell side volume 567, components from the first gas stream may transfer through second set of fibers 553 into the second gas stream. The first gas stream may permeate from shell side volume 567 through outlet subset of fibers 552B into outlet plenum 563B and discharge through port 558B.

First set of fibers 552 and second set of fibers 553 may have different permeabilities. For example, first set of fibers 552 may be indiscriminately permeable to gases, such that gases from first gas stream may pass through first set of fibers 552 at a relatively same rate. In contrast, second set of fibers 553 may be discriminately permeable to gases, such that gases from the second gas stream may pass through at different rates. For example, second set of fibers 553 may be semi-permeable, such that water vapor may pass through at a higher rate than other components of the second gas stream. As illustrated in FIG. 5C, a portion of inlet subset of fibers 552A extends through inlet plenum 564A, while a portion of outlet subset of fibers 552B extends through outlet plenum 564B. To reduce permeation of the second gas stream into first set of fibers 552, the portion of inlet subset of fibers 552A in inlet plenum 564A and the portion of outlet subset of fibers 552B in outlet plenum 564B may be coated with an impermeable coating 553A and 553B, respectively, or include a tube isolating the fibers from a respective volume in plenum 564A or 564B.

Figure 5D:
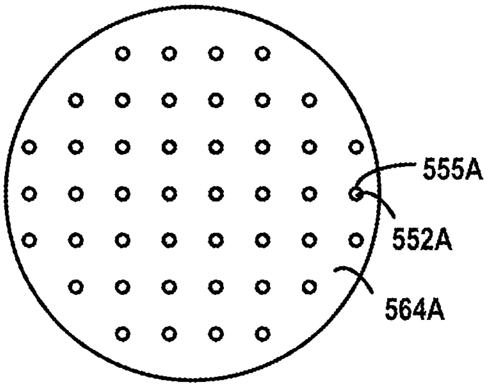
FIG. 5D is a cross-sectional front view diagram illustrating an inlet plenum of the example membrane gas separator of FIG. 5C.

Both inlet plenum 563A and outlet plenum 563B are configured to contain the second gas stream and maintain separation between the second gas stream in plenums 563A and 563B and the first gas stream in respective fibers 552A and 552B. FIG. 5D is a cross-sectional front view diagram illustrating inlet plenum 564A of the example membrane gas separator 501 of FIG. 5C. Within inlet plenum 564A, inlet subset of fibers 552A includes coating 555A, such that inlet plenum 564A is fluidically coupled to only second set of fibers 553. Similarly, FIG. 5F is a cross-sectional front view diagram illustrating an outlet plenum 563B of the example membrane gas separator 501 of FIG. 5C. Within outlet plenum 563B, outlet subset of fibers 552B includes coating 555B, such that outlet plenum 564B is fluidically coupled to only second set of fibers 553. As illustrated in FIGS. 5D and 5F, inlet and outlet subsets of fibers 552A and 552B include non-overlapping patterns, such that subsets of fibers 552A and 552B are spaced adequately within shell side volume 567.

Figure 5E:
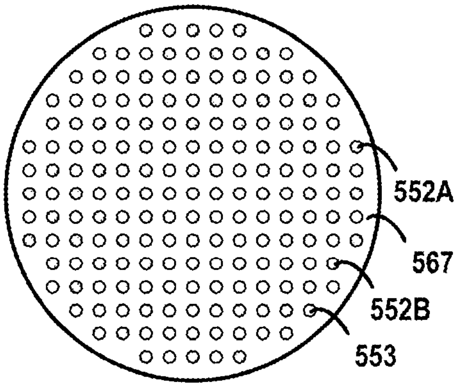
FIG. 5E is a cross-sectional front view diagram illustrating a shell side volume of the example membrane gas separator of FIG. 5C.
Figure 5F:
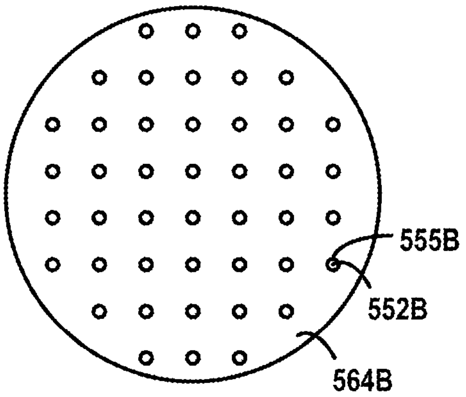
FIG. 5F is a cross-sectional front view diagram illustrating an outlet plenum of the example membrane gas separator of FIG. 5C.

FIG. 5E is a cross-sectional front view diagram illustrating shell side volume 567 of the example membrane dehumidifier 501 of FIG. 5C. Shell side volume 567 includes both uncoated inlet and outlet subsets of fibers 552A, 552B and second set of fibers 553. Inlet subset of fibers 552A may discharge the first gas stream into shell side volume 567. Components from the gas in shell side volume may permeate across second set of fibers 553 into the second gas stream. The gas in shell side volume may flow into outlet subset of fibers 552B to be removed from membrane gas separator 501.

Various examples have been described. These and other examples are within the scope of the following claims.

Example 1: A separation system includes a membrane separator configured to receive two or more fluid streams, wherein the membrane separator comprises a hollow fiber membrane includes a first set of fibers configured to transfer one or more components from a first gas stream into a shell side volume; and a second set of fibers configured to transfer the one or more components from the shell side volume into a second gas stream.

Example 2: The separation system of example 1, wherein the two or more fluid streams comprise the first gas stream and a liquid sorbent stream, and wherein the membrane separator comprises a membrane contactor configured to absorb the one or more components from the first gas stream into a liquid sorbent of the liquid sorbent stream in the shell side volume.

Example 3: The separation system of example 2, wherein the membrane contactor is configured to desorb at least a portion of the one or more components from the liquid sorbent into the second gas stream.

Example 4: The separation system of example 3, wherein the membrane contactor is a first membrane contactor configured to desorb a first portion of the one or more components from the liquid sorbent into the second gas stream, and wherein the separation system comprises a second membrane contactor configured to desorb a second portion of the one or more components from the liquid sorbent into a product stream.

Example 5: The separation system of any of examples 3 and 4, wherein the first set of fibers is positioned at least partially upstream of the second set of fibers with respect to a flow of the liquid sorbent, and wherein the membrane separator is configured to maintain a temperature of the liquid sorbent proximate to the first set of fibers higher than a temperature of the liquid sorbent proximate to the second set of fibers.

Example 6: The separation system of example 5, further comprising one or more heat traces configured to heat the liquid sorbent.

Example 7: The separation system of any of examples 1 through 6, wherein the two or more fluid streams comprise the first gas stream and the second gas stream, and wherein the membrane separator comprises a membrane gas separator configured to transfer the one or more components from the first gas stream into the second gas stream via the shell side volume.

Example 8: The separation system of example 7, wherein the first set of fibers and the second set of fibers have a different permeability to the one or more components.

Example 9: The separation system of any of examples 7 and 8, wherein the membrane gas separator comprises a membrane dehumidifier configured to transfer water vapor from the first gas stream into the second gas stream via the shell side volume.

Example 10: The separation system of example 9, wherein the separation system further comprises one or more membrane contactors configured to: absorb the one or more components from the first gas stream into a liquid sorbent; and desorb at least a portion of the one or more components from the liquid sorbent into a product stream.

Example 11: The separation system of any of examples 1 through 10, wherein the membrane separator further comprises: a housing; a first tubesheet set coupled to the first set of fibers; and a second tubesheet set coupled to the second set of fibers.

Example 12: The separation system of example 11, wherein the housing, the first tubesheet set, and the second tubesheet set define: a first inlet plenum and a first outlet plenum fluidically coupled to the first set of fibers, a second inlet plenum and a second outlet plenum fluidically coupled to the second set of fibers, and the shell side volume.

Example 13: A method includes receiving, by a first set of fibers of a hollow fiber membrane of a membrane separator, a first gas stream that includes one or more components, wherein the membrane separator receives two or more fluid streams; transferring, by the first set of fibers, the one or more components from the first gas stream into a shell side volume; transferring, by a second set of fibers of the hollow fiber membrane, at least a portion of the one or more components from the shell side volume into a second gas stream; and discharging, by the second set of fibers, the second gas stream from the hollow fiber membrane.

Example 14: The method of example 13, wherein the two or more fluid streams comprise the first gas stream and a liquid sorbent stream, wherein the membrane separator comprises a membrane contactor, and wherein transferring the one or more components from the first gas stream into a shell side volume comprises absorbing the one or more components from the first gas stream into a liquid sorbent of the liquid sorbent stream in the shell side volume.

Example 15: The method of example 14, wherein transferring at least a portion of the one or more components from the shell side volume into the second gas stream comprises desorbing at least a portion of the one or more components from the liquid sorbent into the second gas stream.

Example 16: The method of example 15, wherein a first portion of the one or more components is desorbed from the liquid sorbent into the second gas stream by a first membrane contactor, and wherein a second portion of the one or more components is desorbed from the liquid sorbent into a product stream by a second membrane contactor.

Example 17: The method of any of examples 15 and 16, wherein the first set of fibers is positioned at least partially upstream of the second set of fibers with respect to a flow of the liquid sorbent, and wherein the method further comprises maintaining a temperature of the liquid sorbent proximate to the first set of fibers higher than a temperature of the liquid sorbent proximate to the second set of fibers.

Example 18: The method of any of examples 13 through 17, wherein the two or more fluid streams comprise the first gas stream and the second gas stream, wherein the membrane separator comprises a membrane gas separator, and wherein transferring the one or more components from the first gas stream into a shell side volume and transferring at least a portion of the one or more components from the shell side volume into the second gas stream comprises transferring the one or more components from the first gas stream into the second gas stream via the shell side volume.

Example 19: The method of example 18, wherein the membrane gas separator comprises a membrane dehumidifier, and wherein transferring configured to transfer water vapor from the first gas stream into the second gas stream via the shell side volume.

Example 20: The method of example 19, further includes absorbing the one or more components from the first gas stream into a liquid sorbent; and desorbing at least a portion of the one or more components from the liquid sorbent into a product stream.

What is claimed is:

1. A separation system, comprising:

a membrane separator configured to receive two or more fluid streams, wherein the membrane separator comprises a hollow fiber membrane comprising:

a first set of fibers configured to transfer one or more components from a first gas stream into a shell side volume; and a second set of fibers configured to transfer the one or more components from the shell side volume into a second gas stream.

2. The separation system of claim 1, wherein the two or more fluid streams comprise the first gas stream and a liquid sorbent stream, and wherein the membrane separator comprises a membrane contactor configured to absorb the one or more components from the first gas stream into a liquid sorbent of the liquid sorbent stream in the shell side volume.

3. The separation system of claim 2, wherein the membrane contactor is configured to desorb at least a portion of the one or more components from the liquid sorbent into the second gas stream.

4. The separation system of claim 3, wherein the membrane contactor is a first membrane contactor configured to desorb a first portion of the one or more components from the liquid sorbent into the second gas stream, and wherein the separation system comprises a second membrane contactor configured to desorb a second portion of the one or more components from the liquid sorbent into a product stream.

5. The separation system of claim 3, wherein the first set of fibers is positioned at least partially upstream of the second set of fibers with respect to a flow of the liquid sorbent, and wherein the membrane separator is configured to maintain a temperature of the liquid sorbent proximate to the first set of fibers higher than a temperature of the liquid sorbent proximate to the second set of fibers.

6. The separation system of claim 5, further comprising one or more heat traces configured to heat the liquid sorbent.

7. The separation system of claim 1, wherein the two or more fluid streams comprise the first gas stream and the second gas stream, and wherein the membrane separator comprises a membrane gas separator configured to transfer the one or more components from the first gas stream into the second gas stream via the shell side volume.

8. The separation system of claim 7, wherein the first set of fibers and the second set of fibers have a different permeability to the one or more components.

9. The separation system of claim 7, wherein the membrane gas separator comprises a membrane dehumidifier configured to transfer water vapor from the first gas stream into the second gas stream via the shell side volume.

10. The separation system of claim 9, wherein the separation system further comprises one or more membrane contactors configured to:

absorb the one or more components from the first gas stream into a liquid sorbent; and desorb at least a portion of the one or more components from the liquid sorbent into a product stream.

11. The separation system of claim 1, wherein the membrane separator further comprises:

a housing;

a first tubesheet set coupled to the first set of fibers; and a second tubesheet set coupled to the second set of fibers.

12. The separation system of claim 11, wherein the housing, the first tubesheet set, and the second tubesheet set define:

a first inlet plenum and a first outlet plenum fluidically coupled to the first set of fibers, a second inlet plenum and a second outlet plenum fluidically coupled to the second set of fibers, and the shell side volume.

13. A method, comprising:

receiving, by a first set of fibers of a hollow fiber membrane of a membrane separator, a first gas stream that includes one or more components, wherein the membrane separator receives two or more fluid streams;

transferring, by the first set of fibers, the one or more components from the first gas stream into a shell side volume;

transferring, by a second set of fibers of the hollow fiber membrane, at least a portion of the one or more components from the shell side volume into a second gas stream; and discharging, by the second set of fibers, the second gas stream from the hollow fiber membrane.

14. The method of claim 13, wherein the two or more fluid streams comprise the first gas stream and a liquid sorbent stream, wherein the membrane separator comprises a membrane contactor, and wherein transferring the one or more components from the first gas stream into a shell side volume comprises absorbing the one or more components from the first gas stream into a liquid sorbent of the liquid sorbent stream in the shell side volume.

15. The method of claim 14, wherein transferring at least a portion of the one or more components from the shell side volume into the second gas stream comprises desorbing at least a portion of the one or more components from the liquid sorbent into the second gas stream.

16. The method of claim 15, wherein the membrane contactor is a first membrane contactor, wherein a first portion of the one or more components is desorbed from the liquid sorbent into the second gas stream by the first membrane contactor, and wherein a second portion of the one or more components is desorbed from the liquid sorbent into a product stream by a second membrane contactor.

17. The method of claim 15, wherein the first set of fibers is positioned at least partially upstream of the second set of fibers with respect to a flow of the liquid sorbent, and wherein the method further comprises maintaining a temperature of the liquid sorbent proximate to the first set of fibers higher than a temperature of the liquid sorbent proximate to the second set of fibers.

18. The method of claim 13, wherein the two or more fluid streams comprise the first gas stream and the second gas stream, wherein the membrane separator comprises a membrane gas separator, and wherein transferring the one or more components from the first gas stream into a shell side volume and transferring at least a portion of the one or more components from the shell side volume into the second gas stream comprises transferring the one or more components from the first gas stream into the second gas stream via the shell side volume.

19. The method of claim 18, wherein the membrane gas separator comprises a membrane dehumidifier, and wherein transferring the one or more components from the first gas stream into the second shell stream via the shell side volume comprises transferring water vapor from the first gas stream into the second gas stream via the shell side volume.

20. The method of claim 19, further comprising:

absorbing the one or more components from the first gas stream into a liquid sorbent; and desorbing at least a portion of the one or more components from the liquid sorbent into a product stream.

* * * * *